US011099004B2

(12) United States Patent
Lessner et al.

(10) Patent No.: US 11,099,004 B2
(45) Date of Patent: Aug. 24, 2021

(54) METHODS OF DIGITAL IMAGE CORRELATION FOR BIOLOGICAL SAMPLES

(71) Applicant: UNIVERSITY OF SOUTH CAROLINA, Columbia, SC (US)

(72) Inventors: Susan M. Lessner, Newberry, SC (US); Liya Du, Columbia, SC (US)

(73) Assignee: University of South Carolina, Columbia, SC (US)

( * ) Notice: Subject to any disclaimer, the term of this patent is extended or adjusted under 35 U.S.C. 154(b) by 58 days.

(21) Appl. No.: 16/598,107

(22) Filed: Oct. 10, 2019

(65) Prior Publication Data

US 2020/0116475 A1 Apr. 16, 2020

Related U.S. Application Data

(60) Provisional application No. 62/743,874, filed on Oct. 10, 2018, provisional application No. 62/807,045, filed on Feb. 18, 2019.

(51) Int. Cl.
| | |
|---|---|
| *G01N 1/00* | (2006.01) |
| *G01B 11/16* | (2006.01) |
| *G01N 1/30* | (2006.01) |
| *G01N 1/38* | (2006.01) |

(52) U.S. Cl.
CPC .............. *G01B 11/16* (2013.01); *G01N 1/30* (2013.01); *G01N 1/38* (2013.01)

(58) Field of Classification Search
None
See application file for complete search history.

(56) References Cited

U.S. PATENT DOCUMENTS

| | | | |
|---|---|---|---|
| 7,133,570 B1 | 11/2006 | Schreier et al. | |
| 2015/0338324 A1* | 11/2015 | Gigan | G02B 5/0273 |
| | | | 435/5 |

OTHER PUBLICATIONS

Aaron, et al. "Polarization microscopy with stellated gold nanoparticles for robust, in-situ monitoring of biomolecules" *Opt. Exp.* 16 (2008) pp. 2153-2167.

Avril, et al. "Anisotropic and hyperelastic identification of in vitro human arteries from full-field optical measurements" *J. Biomech.* 43 (2010) pp. 2978-2985.

(Continued)

*Primary Examiner* — Jyoti Nagpaul
(74) *Attorney, Agent, or Firm* — Dority & Manning, P.A.

(57) ABSTRACT

A method of marking a hydrated tissue specimen for mechanical testing is provided. The method includes adding a metal nanoparticle precursor solution to a reducing agent solution to form a mixture; incubating the mixture to form a plurality of aggregated metal nanoparticles, where each of the aggregated metal nanoparticles includes a plurality of individual metal nanoparticles; separating the plurality of aggregated metal nanoparticles from a supernatant by means of centrifugation or gravitational settling; resuspending the plurality of aggregated metal nanoparticles in a buffer solution to form a colloidal metal nanoparticle suspension; and soaking the hydrated tissue specimen in the colloidal metal nanoparticle suspension, where at least a portion of the plurality of aggregated metal nanoparticles adhere to the hydrated tissue specimen in a random pattern of speckles.

19 Claims, 21 Drawing Sheets
(10 of 21 Drawing Sheet(s) Filed in Color)

(56) References Cited

OTHER PUBLICATIONS

Barta, et al. "Underwater binocular imaging of aerial objects versus the position of eyes relative to the flat water surface" *J. Opt. Soc. Am. A* 20(12) (2003) pp. 2370-2377.
Ferreira, et al. "Stereo reconstruction of a submerged scene" *Proc. IBPRIA* (2005) pp. 102-109.
Forbes, et al. "The composition of the adult human body as determined by chemical analysis" *J. Biol. Chem.* 203 (1953) pp. 359-366.
Foster, et al. "Holography for underwater inspection and measurement: an overview of current work" *Opt. Laser Technol.* 29 (1997) pp. 17-23.
Gennery, D. B. "Generalized camera calibration including fish-eye lenses" *Int. J. Comp. Vision* 68(3) (2006) pp. 239-266.
Gleason, et al. "A multiaxial computer-controlled organ culture and biomechanical device for mouse carotid arteries" *J. Biomech. Eng.* 126 (2004) pp. 787-795.
Hecht, et al. "Optics" *Addison-Wesley Publishing Co.* (1974) pp. 62-68.
Hobson, et al. "Accurate three-dimensional metrology of underwater objects using replayed real images from in-line and off-axis holograms" *Meas. Sci. Technol.* 10 (1999) pp. 1153-1161. (Abstract only).
Horváth, et al. "On the structure of the aerial visual field of aquatic animals distorted by refraction" *Bull. Math. Biol.* 53(3) (1991) pp. 425-441.
Ke, et al. "Robust stereo vision and calibration methodology for accurate three-dimensional digital image correlation measurements on submerged objects" *J. Strain Anal.* 43 (2008) pp. 659-704.
Kilpatrick, et al. "Underwater hologrammetiy: aberrations in the real image of an underwater object when replayed in air" *J. Phys. D: Appl. Phys.* 21 (1988) pp. 1701-1705.
Kwon, et al. "Applicability of four localized-calibration methods in underwater motion analysis" *ISBS Conf. Proc. Arch.* 1(1) (2000) pp. 1-8.
Kwon, Y.H. "Object plane deformation due to refraction in two-dimensional underwater motion analysis" *J. Appl. Biomech.* 15 (1999) pp. 396-403.
Kwon, Y.H. "A camera calibration algorithm for the underwater motion analysis" *Proc. ISIS* (1999) pp. 257-260.
Lavest, et al. "Dry camera calibration for underwater applications" *Mach. Vision Appl.* 13 (2003) pp. 245-253.
Lecompte, et al. "Quality assessment of speckle patterns for digital image correlation" *Opt. Lasers Eng.* 44 (2006) pp. 1132-1145.
Moore, K.D. "Intercalibration method for underwater three-dimensional mapping laser line scan systems" *Appl. Optics* 40(33) (2001) pp. 5991-6004.
Ning, et al. "Speckle patterning of soft tissues for strain field measurement using digital image correlation: preliminary quality assessment of patterns" *Micro. Microanal.* 17 (2011) pp. 81-90.
Ning, et al. "Deformation measurements and material property estimation of mouse carotid artery using a microstructure-based constitutive model" *J. Biomech. Eng.* 132:121010 (2010).
Pan, et al. "Mean intensity gradient: an effective global parameter for quality assessment of the speckle patterns used in digital image correlation" *Opt. Lasers Eng.* 48 (2010) pp. 469-477.
Plakas, et al. "Uncalibrated vision for 3D underwater applications" *Oceans '98 IEEE/OES Conf. Proc.* 1 (1998) pp. 272-276.
Press, et al. "Numerical recipes in C" *Cambridge University Press* (1992) pp. 683-687.
Reu, et al. "Uncertainty quantification for digital image correlation" *Sandia Natl Lab.* SAND2009-2023C (2009) pp. 1-7.
Schreier, et al. "Advances in light microscope stereo vision" *Exper. Mech.* 44(3) (2004) pp. 278-288.
Schreier, H.W. "Investigation of two- and three-dimensional image correlation techniques with applications in experimental mechanics" *University South Carolina* (2003).
Schreier, et al. "Systematic errors in digital image correlation caused by intensity interpolation" *Opt. Eng.* 39(11) (2000) pp. 2915-2921.
Sokolov, et al. "Real-Time Vital Optical Imaging of Precancer Using Anti-Epidermal Growth Factor Receptor Antibodies Conjugated to Gold Nanoparticles" *Cancer Res.* 63 (2003) pp. 1999-2004.
Stone, et al. "Using Gold Nanorods to Probe Cell-Induced Collagen Deformation" *Nano Lett.* 7(1) (2007) pp. 116-119.
Sutton, et al. "Image correlation for shape, motion and deformation measurements: Basic concepts, theory and applications" *Springer* (2009) pp. 1-321.
Sutton, et al. "Strain Field Measurements on Mouse Carotid Arteries Using Microscopic Three-Dimensional Digital Image Correlation" *J. Biomed. Mat. Res. Pt. A* (2008) pp. 178-190.
Sutton, et al. "Development of a Methodology for Non-Contacting Strain Measurements in Fluid Environments Using Computer Vision" *Opt. Lasers Eng.* 32 (2000) pp. 367-377.
Sutton, et al. "Advances in Two-Dimensional and Three-Dimensional Computer Vision" *Photomechanics: Topics Appl. Phys.* 77 (2000) pp. 323-372.
Sutton, et al. "Effects of subpixel image restoration on digital correlation error estimates" *Opt. Eng.* 27(10) (1988) pp. 870-877.
Tetlow, et al. "Three-dimensional measurement of underwater work sites using structural laser light" *Meas. Sci. Technol.* 10 (1999) pp. 1162-1167.
Wang, et al. "Quantitative error assessment in pattern matching: Effects of intensity pattern noise, interpolation, strain and image contrast on motion measurements" *Strain* 45 (2009) pp. 160-178.
Watson, et al. "(Second) Harmonic Disharmony: Nonlinear Microscopy Shines New Light on the Pathology of Atherosclerosis" *Micro. Microanal.* 22 (2016) pp. 589-598.
Zhang, et al. "Applications of digital image correlation to biological tissues" *J. Biomed. Opt.* 9 (2004) pp. 691-699.
Zhang, et al. "Evaluating the mechanical behavior of arterial tissue using digital image correlation" *Exper. Mech.* 42(4) (2002) pp. 409-416.

\* cited by examiner

METHODS OF DIGITAL IMAGE CORRELATION FOR BIOLOGICAL SAMPLES

CROSS REFERENCE TO RELATED APPLICATIONS

This application claims priority to U.S. Provisional Application Ser. No. 62/743,874, having a filing date of Oct. 10, 2018; and U.S. Provisional Application Ser. No. 62/807,045, having a filing date of Feb. 18, 2019, both of which are incorporated herein in their entirety by reference thereto.

FEDERAL RESEARCH STATEMENT

This invention was made with government support under Grant No. R01 HL133662, awarded by the National Institutes of Health (NIH), and CMMI-1760906, awarded by the National Science Foundation (NSF). The government has certain rights in the invention.

BACKGROUND OF THE INVENTION

Digital image correlation is a non-destructive and non-contact optical technique often used to measure the mechanical properties (e.g., deformation, strain, etc.) of a specimen by tracking a random speckle pattern on the surface of the specimen via a digital camera. When the specimen is a biological tissue specimen (e.g., a blood vessel, artery, tendon, ligament, etc.), in order to achieve accurate measurements of the biological tissue samples in vivo mechanical properties, the biological tissue sample should undergo mechanical testing in an environment that is close to its natural, hydrated state. For instance, human soft tissues can be from about 25% water by weight to greater than 75% water by weight, and the mechanical behavior of such tissues is highly dependent on the hydration state. As one example, some water in soft tissues is tightly bound within the extracellular matrix, such as water molecules associated with highly negatively charged proteoglycans, and its removal leads to the collapse of the associated matrix architecture, thus changing the tissue's mechanical properties. Unfortunately, because the biological tissue specimen should thus be subjected to mechanical testing in a hydrated state for the reasons described above, there are challenges in applying the random speckle pattern to the hydrated tissue specimen using conventional methods (e.g., spray paint or toner powder). Specifically, the spray paint and toner powder are difficult to evenly distribute on the surface of a hydrated tissue specimen. As such, hydrated tissue specimens must typically be dehydrated before applying speckle patterns via spray paint or toner powder, which can alter the true mechanical properties of the tissue specimen and produce inaccurate results. Further, once re-submerged in water or an aqueous solution in order to return the tissue specimen to its natural hydrated state for mechanical testing, the speckle pattern applied via toner powder does not remain adhered to the tissue specimen. In addition, it is difficult to control the size of the speckles for random speckle patterns applied via the spray paint or toner powder methods.

An additional problem with speckling soft tissue specimens is that soft tissues experience large deformation under loading. For example, elastin-rich tissues such as ligaments and arteries can undergo strains of 50% or more under load and return to their initial dimensions with little obvious damage (e.g., without hysteresis in the loading-unloading curve). Therefore, any type of random speckle pattern created by coating the specimen must not only deform with the underlying tissue but most also resist delamination, cracking, or wrinkling.

As such, a need exists for an improved marking solution and method of applying the marking solution to a hydrated tissue specimen to form a random speckle pattern on the hydrated tissue specimen so that the hydrated tissue specimen's mechanical properties can be determined via digital image correlation in a non-contacting and non-destructive manner where the speckle pattern remains stable and resists delamination, cracking, or wrinkling.

SUMMARY OF THE INVENTION

According to one particular embodiment of the present invention, a method of marking a hydrated tissue specimen for mechanical testing is provided. The method includes adding a metal nanoparticle precursor solution to a reducing agent solution to form a mixture; incubating the mixture to form a plurality of aggregated metal nanoparticles, where each of the aggregated metal nanoparticles includes a plurality of individual metal nanoparticles; separating the plurality of aggregated metal nanoparticles from a supernatant by means of centrifugation or gravitational settling; resuspending the plurality of aggregated metal nanoparticles in a buffer solution to form a colloidal metal nanoparticle suspension; and soaking the hydrated tissue specimen in the colloidal metal nanoparticle suspension, wherein at least a portion of the plurality of aggregated metal nanoparticles adhere to the hydrated tissue specimen in a random pattern of speckles.

In one embodiment, each of the plurality of individual metal nanoparticles can have a particle size ranging from about 100 nanometers to about 200 nanometers.

In another embodiment, each of the plurality of aggregated metal nanoparticles can have a particle size ranging from about 0.75 micrometers to about 100 micrometers.

In still another embodiment, the plurality of individual metal nanoparticles can include gold nanoparticles, silver nanoparticles, nickel nanoparticles, or platinum nanoparticles.

In yet another embodiment, the method can further include the step of subjecting the hydrated tissue specimen to one or more mechanical testing protocols, where an image capture device can obtain a plurality of images of the hydrated tissue specimen, and where a displacement of one or more speckles present on the tissue specimen can be monitored.

In one more embodiment, the metal nanoparticle precursor solution can include chloroauric acid, silver nitrate, nickel chloride, dihydrogen hexachloroplatinate, or tetrammineplatinum (II) chloride.

In an additional embodiment, the metal nanoparticle precursor solution can have a molarity ranging from about 0.0005M to about 0.15M.

In one particular embodiment, the reducing agent solution can include ascorbic acid, sodium citrate, sodium borohydride, ethylene glycol, or hydrazine.

In still another embodiment, the reducing agent solution can have a molarity ranging from about 0.1M to about 0.4M.

In yet another embodiment, the metal nanoparticle precursor solution can be present in an amount ranging from about 1.01% by volume to about 4% by volume based on a total volume of the mixture.

In one more embodiment, the reducing agent solution can be present in an amount ranging from about 96% by volume to about 98.99% by volume based on a total volume of the mixture.

In an additional embodiment, the mixture can be incubated for a time period ranging from about 2 days to about 8 days.

In another embodiment, the mixture can be incubated at a temperature ranging from about 20° C. to about 25° C.

In yet another embodiment, a stabilizer can be added to the mixture, wherein the stabilizer comprises alginate, agar, carrageenan, cellulose, gelatin, guar gum, gum arabic, locust bean gum, pectin, starch, xanthan gum, or a combination thereof.

According to another particular embodiment of the present invention, a marking solution for marking a hydrated tissue specimen with a random speckle pattern is provided. The marking solution includes a colloidal metal nanoparticle suspension containing a plurality of aggregated metal nanoparticles, where each of the plurality of aggregated metal nanoparticles includes a plurality of individual metal nanoparticles, where each of the plurality of aggregated metal nanoparticles has a particle size ranging from about 0.75 micrometers to about 100 micrometers, and where each of the plurality of individual metal nanoparticles has a particle size ranging from about 100 nanometers to about 200 nanometers.

According to one more embodiment of the present invention, a tissue specimen mechanical testing system is provided. The system includes an apparatus configured to subject the tissue specimen to one or more mechanical testing protocols; an image capture device configured to obtain a plurality of images of the tissue specimen as it is subjected to the one or more mechanical testing protocols; a marking solution for applying a random speckle pattern to the tissue specimen when the tissue specimen is in a hydrated state; a first memory for storing data corresponding to measured positions of selected image points from the plurality of images to monitor a displacement of one or more speckles present on the tissue specimen; a second memory for storing software in the form of computer-executable instructions; and a processor coupled to the first and second memories and configured to selectively implement the computer-executable instructions stored in the second memory to process the data stored in the first memory, where the processor implements the computer-executable instructions stored in the second memory in order to implement the functions of determining one or more mechanical properties of the tissue specimen.

In one embodiment, the marking solution can include a colloidal metal nanoparticle suspension. Moreover, the colloidal metal nanoparticle suspension can include a plurality of aggregated metal nanoparticles, where each of the aggregated metal nanoparticles can include a plurality of individual metal nanoparticles. Further, each of the plurality of individual metal nanoparticles can have a particle size ranging from about 100 nanometers to about 200 nanometers, and each of the plurality of aggregated metal nanoparticles can have a particle size ranging from about 0.75 micrometers to about 100 micrometers. In addition, the plurality of individual metal nanoparticles can include gold nanoparticles, silver nanoparticles, nickel nanoparticles, or platinum nanoparticles.

In an additional embodiment, the image capture device can include a digital camera that further includes a charge coupled device.

Other features and aspects of the present invention are set forth in greater detail below.

BRIEF DESCRIPTION OF THE DRAWINGS

The patent or application file contains at least one drawing executed in color. Copies of this patent or patent application publication with color drawing(s) wilt be provided by the Office upon request and payment of the necessary fee.

Figure 1:
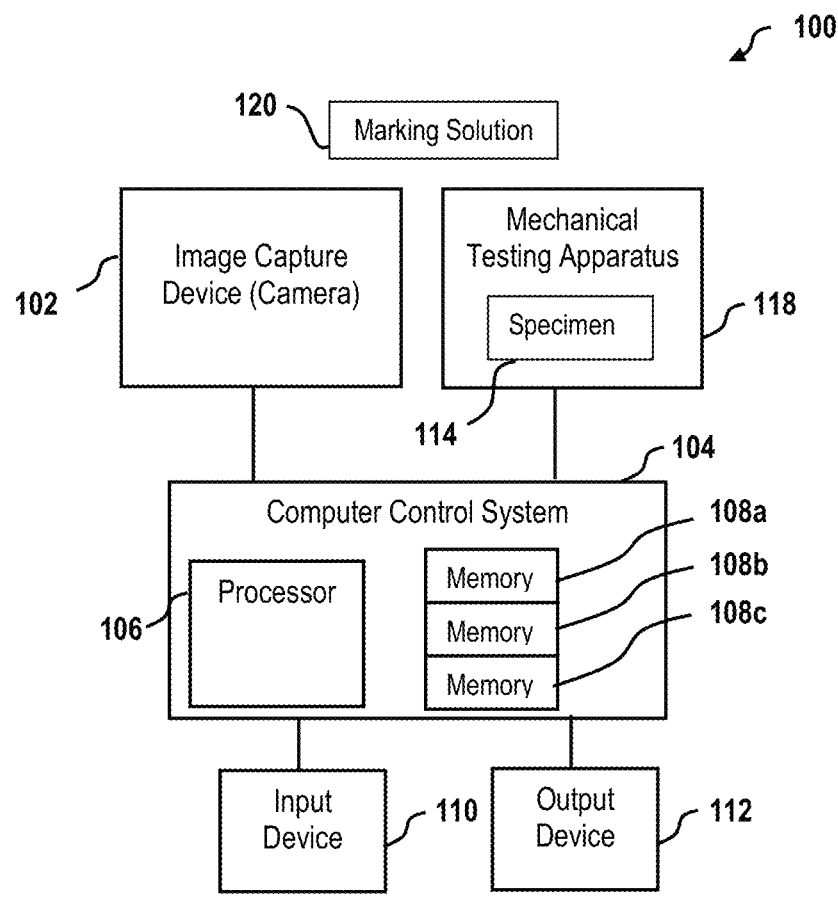
FIG. 1 is a schematic representation of the mechanical testing system contemplated by the present invention.

A full and enabling disclosure of the present invention, including the best mode thereof to one skilled in the art, is set forth more particularly in the remainder of the specification, which includes reference to the accompanying figures.

Repeat use of reference characters in the present specification and drawings is intended to represent the same or analogous features or elements of the present invention.

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

Generally speaking, the present invention provides a means to measure the mechanical properties of biological soft tissue specimens (e.g., strains on blood vessels) via digital image correlation (DIC) by providing a random speckle pattern that can be tracked optically, in a non-contacting and non-destructive manner, using appropriate camera systems and software, where the resulting random speckle pattern can resist delamination, cracking, or wrinkling as the soft tissue specimen undergoes mechanical testing. DIC is based on the concept of optically tracking the displacements of the random speckle pattern created on the surface of a specimen, and in the case of soft biological tissues, there are several advantages to utilizing DIC since it can provide local, rather than global, deformations, and it is suitable for large strain measurements that are typical of soft biological tissues taken to failure. Further, creation of the random speckle pattern on the specimen does not change the natural mechanical behavior of the specimen being tested. In addition, the speckle pattern can be random due to coordinate covalent and hydrophobic interactions, where the term "random" implies that the pattern within an original subset area on a surface of specimen and its corresponding image after deformation can be uniquely matched in a least squares best-fit sense. In contrast, speckle patterns that are too regular in their intensity variation (e.g., a grid of evenly spaced black dots on a white background) or that have too small an intensity range (low contrast) can give rise to non-unique solutions during the matching process. Meanwhile, the present inventors have found that a random speckle pattern that creates individual speckles that cover 3-5 pixels in each direction at the image plane of the camera used during DIC allows for optimum pattern tracking. Also, the random speckle pattern of the present invention can remain stable even when the specimen is submerged in aqueous solutions. Specifically, the random speckle pattern that can be created according to the methods of the present invention can provide high contrast, the size of the speckles can be controlled, and the speckle pattern can be firmly attached to the specimen during deformation to allow for optimized DIC. In summary, the unique surface chemistry, chemical inertness, and optical properties of the random speckle pattern contemplated by the present invention and discussed in greater detail herein can enable the accurate measurement of strain and other deformations using DIC.

As mentioned above, the present invention is used to create a random speckle pattern for measuring mechanical strain or displacement or any other desired mechanical property by means of digital image correlation. The present invention is useful for application of digital image correlation to soft biological tissue specimens because (1) the specimen does not have to be dried for application of the random speckle pattern; (2) the random speckle pattern remains stable when the material is submerged; (3) the size of the material forming the random speckle pattern can be varied to make it suitable for application to specimens having a range of sizes; and (4) the random speckle pattern resists delamination, cracking, or wrinkling during deformation of the tissue specimen.

Notably, the method of the present invention for applying a random speckle pattern to a specimen does not require that the specimen be dehydrated to apply the pattern, as dehydration can alter the mechanical properties and produce inaccurate results. Thus, the method of the present invention can provide superior accuracy in measuring the mechanical strain on soft biological tissues. In addition, this approach requires minimal operator skill to apply, while current approaches often use spray paint to create a speckle pattern, where it is difficult to control the speckle size by spraying. Further, the pattern remains adherent to the specimen when it is submerged in water or other aqueous solutions. Thus, the specimen can be maintained in a state close to its native environment for accurate mechanical property determinations. Additionally, the random speckle pattern is nontoxic based on the inert materials from which it is formed. Specifically, the random speckle pattern can be applied to a hydrated tissue specimen by immersing or soaking the specimen in a suspension of colloidal metal nanoparticles Referring now to FIG. 1, a tissue specimen mechanical testing system 100 that can be used to subject a hydrated tissue specimen to one or more mechanical testing protocols via a mechanical testing apparatus 118 and monitor and track the movement of the random speckle pattern (see FIGS. 2a-2b and FIGS. 3a-3b showing speckle pattern 116 on a hydrated tissue specimen 114) applied via the methods of the present invention to determine various mechanical properties of the tissue specimen is illustrated. The system 100 can include a special purpose computer control system for implementing the mechanical testing protocols. More particularly, the exemplary system 100 includes at least one image capture device 102 in the form of a digital camera that can include a charge coupled device. Further, a computer control system 104 may generally include such components as at least one memory/media element or database for storing data and software instructions as well as at least one processor 106. In the particular example of FIG. 1, the processor 106 and associated memory/media elements 108a, 108b, and 108c can be configured to perform a variety of computer-implemented functions (i.e., software-based data services). At least one memory/media element 108b is dedicated to electronically storing software and/or firmware in the form of computer-readable and executable instructions that will be implemented by the processor 106. Other memory/media elements (e.g., memory/media elements 108a and 108c) can be used to store data which will also be accessible by the processor 106 and which will be acted on per the software instructions stored in memory/media element 108b.

The various memory/media elements of FIG. 1 may be provided as a single or multiple portions of one or more varieties of computer-readable media, such as but not limited to any combination of volatile memory (e.g., random access memory (RAM, such as DRAM, SRAM, etc.)) and nonvolatile memory (e.g., ROM, flash, hard drives, magnetic tapes, CD-ROM, DVD-ROM, etc.), or any other memory devices including diskettes, drives, other magnetic-based storage media, optical storage media and others. Although FIG. 1 shows three separate memory/media elements 108a, 108b, and 108c, the content dedicated to such devices may actually be stored in one memory/media element or in multiple elements, or any other variations of data storage as will be appreciated by one of ordinary skill in the art.

In one particular embodiment of the present subject matter, a first portion of memory/media 108a is configured to store data corresponding to a plurality of images obtained from the image capture device 102 as well as measured positions of selected image points determined from the plurality of images. As such, the input data stored in the first memory/media element 108a may include captured images, extracted data associated with selected image points from the captured images used to monitor the displacement of one or more speckles present on the tissue specimen in the form of the random speckle pattern, etc. Further, some of the input data stored in the memory/media element 108a may include information related to the tissue specimen that can be entered as input data from a user accessing an input device 110, which may correspond to one or more peripheral devices configured to operate as a user interface with the computer control system 104. Exemplary input devices may include but are not limited to a keyboard, touch-screen monitor, microphone, mouse and the like.

Meanwhile, the second memory element 108b can include computer-executable software instructions that can be read and executed by the processor 106 to act on the data stored in memory/media element 108a to create new output data (e.g., processed image data, measured displacements, calculated mechanical properties, etc.) for storage in a third memory/media element 108c. Such output data may be provided to a peripheral output device 112, such as a monitor, printer, or other device for visually depicting the output data, or as control signals to still further components. The processor 106 may be adapted to operate as a special-purpose machine by executing the software instructions rendered in a computer-readable form stored in memory/media element 108b. When software is used, any suitable programming, scripting, or other type of language or combinations of languages may be used to implement the teachings contained herein. In other embodiments, the methods disclosed herein may alternatively be implemented by hard-wired logic or other circuitry, including, but not limited to application-specific circuits.

Regardless of the particular arrangement of the system 100, the system 100 includes or can be used in conjunction with a marking solution 120 for applying a stable random speckle pattern to the hydrated tissue specimen 114. The components of the marking solution 120 and a method 500 of making the marking solution 120 are discussed in more detail below.

According to one embodiment of the present invention, the marking solution 120 can be in the form of a colloidal metal nanoparticle suspension that contains a plurality of aggregated metal nanoparticles. Further, each of the plurality of aggregated metal nanoparticles can include a plurality of individual metal nanoparticles. Depending on the various components used to form the marking solution, each of the aggregated metal nanoparticles can have a particle size ranging from about 0.75 micrometers to about 100 micrometers, such as from about 0.8 micrometers to about 50 micrometers, such as from about 0.85 micrometers to about 25 micrometers, such as from about 0.9 micrometers to about 15 micrometers, such as from about 1 micrometer to about 10 micrometers, such as from about 1.25 micrometers to about 7.5 micrometers. The present inventors have found that within this particle size range, the aggregated metal nanoparticles can form speckles on a hydrated tissue specimen that span a size of about 3 pixels to about 5 pixels, which has proven effective for sufficient digital image correlation. Moreover, each of the individual nanoparticles in an aggregate can have a particle size ranging from about 100 nanometers to about 200 nanometers, such as from about 105 nanometers to about 195 nanometers, such as from about 110 nanometers to about 190 nanometers.

Figure 8:
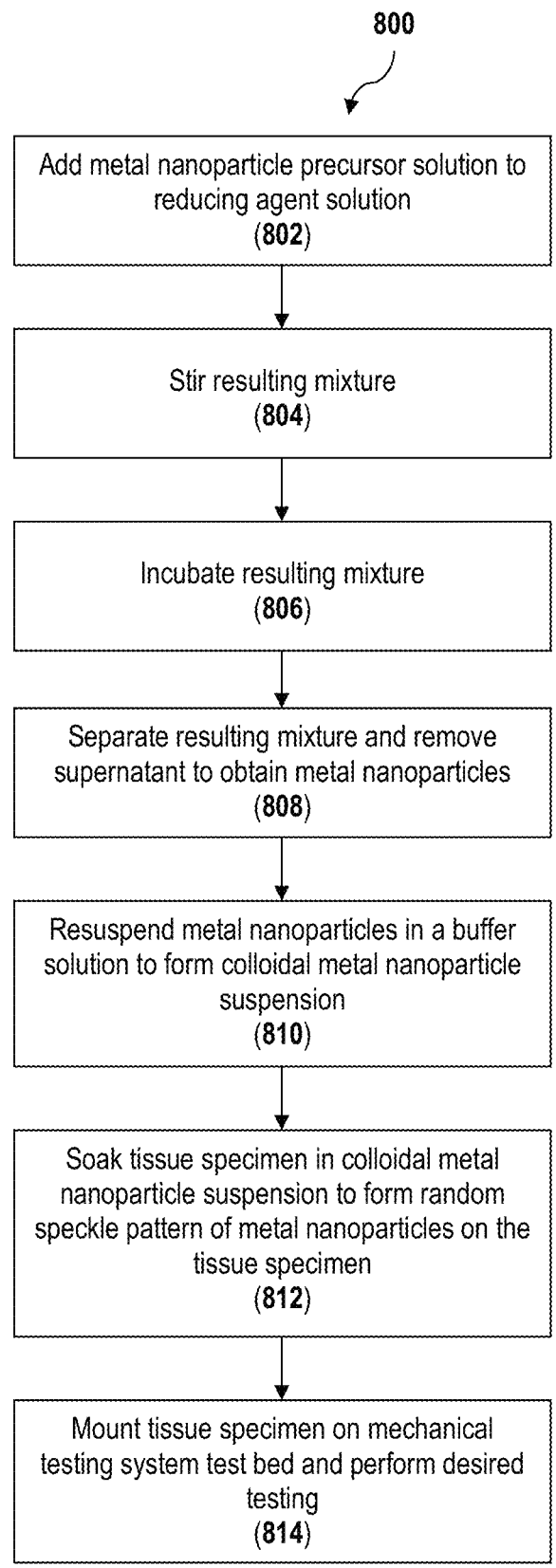
FIG. 8 illustrates a method for forming a marking solution and then marking a hydrated tissue specimen for mechanical testing according to one embodiment of the present invention.

Referring now to FIG. 8, a method 800 for forming the marking solution 120 used to then mark a hydrated tissue specimen 114 with a random speckle pattern 116 is described in detail. First, in step 802, a metal nanoparticle precursor solution can be added to a reducing agent solution to form a mixture. The metal nanoparticle precursor solution can be any suitable nanoparticle precursor solution and can vary depending on the particular metal nanoparticle that is being formed (e.g., gold, silver, platinum, etc.). In one particular embodiment, when gold nanoparticles are being formed, the metal nanoparticle precursor solution can be chloroauric acid ($HAuCl_4$). On the other hand, when silver nanoparticles are being formed, the metal nanoparticle precursor solution can be silver nitrate ($AgNO_3$), and when nickel nanoparticles are being formed, the metal nanoparticle precursor solution can be nickel chloride ($NiCl_2$). In addition, another possible metal nanoparticle precursor solution can be dihydrogen hexachloroplatinate ($H_2PtCl_6.6H_2O$) or tetraamine platinum (II) chloride ($Pt(NH_3)_4Cl_2.xH_2O$) Meanwhile, the reducing agent solution can include ascorbic acid ($C_6H_8O_6$), sodium citrate ($Na_3C_6H_5O_7$), sodium borohydride (NaBR), ethylene glycol ($C_2H_6O_2$), or hydrazine ($N_2H_4$). Further, the volume percent and molarity of the metal nanoparticle precursor solution and the reducing agent selection can be selectively controlled to ultimately form a plurality of individual metal nanoparticles and aggregates of metal nanoparticles having the particle sizes set forth above. For instance, the metal nanoparticle precursor solution can have a molarity ranging from about 0.0005M to about 0.15M, such as from about 0.00075M to about 0.125M, such as about 0.001M to about 0.1M, while the reducing agent solution can have a molarity ranging from about 0.1 M to about 0.4M, such as from about 0.25M to about 0.35M, such as from about 0.275M to about 0.325M. Moreover, the metal nanoparticle precursor solution can be present in the mixture in an amount ranging from about 1.01% by volume to about 4% by volume, such as from about 1.05% by volume to about 3.5% by volume, such as from about 1.1% by volume to about 3% by volume, such as from about 1.2% by volume to about 2.5% by volume based on the total volume of the mixture. Meanwhile, the reducing agent solution can be present in the mixture in an amount ranging from about 96% by volume to about 98.99% by volume, such as from about 96.5% by volume to about 98.95% by volume, such as from about 97% by volume to about 98.9% by volume, such as from about 98.8% by volume to about 97.5% by volume based on the total volume of the mixture.

Regardless of the particular metal nanoparticle precursor solution and reducing agent solution utilized in step 802, next, in step 804, the mixture of the metal nanoparticle precursor solution and the reducing agent solution can be stirred vigorously for a time period ranging from about 5 minutes to about 25 minutes, such as from about 10 minutes to about 20 minutes, such as about 15 minutes.

Thereafter, in step 806, the mixture can be incubated at a temperature ranging from about 20° C. to about 25° C., such as about 23° C. for at time period ranging from about 2 days to about 8 days, such as from about 3 days to about 7 days, such as about 4 days to about 6 days to allow for the precipitation of individual metal nanoparticles and the subsequent aggregation of the individual metal nanoparticles.

Further, in some embodiments, during the incubation period, a stabilizer can be added to the mixture in order to control the size of the resulting plurality of aggregated metal nanoparticles. Although any suitable stabilizer can be utilized, in some embodiments, the stabilizer can include alginate, agar, carrageenan, cellulose, gelatin, guar gum, gum arabic, locust bean gum, pectin, starch, xanthan gum, or a combination thereof. In one particular embodiment, the stabilizer can be gum arabic. Regardless of the particular stabilizer utilized, the stabilizer can be added to the mixture at concentration ranging from about 0.1 wt. % to about 0.5 wt. %, such as from about 0.15 wt. % to about 0.4 wt. %, such as from about 0.2 wt. % to about 0.3 wt. % based on the total weight of the mixture. In addition, the time period at which the stabilizer is added to the mixture after the metal nanoparticle precursor solution is added to a reducing agent solution to form a mixture can range from about 0 hours to about 96 hours, such as from about 12 hours to about 84 hours, such as from about 24 hours to about 72 hours, such as from about 36 hours to about 60 hours. The present inventors have found that the particular time point at which the stabilizer can be added provides additional control over the size of the resulting plurality of aggregated metal nanoparticles.

Further, in step 808, the mixture is separated by centrifugation or gravitational settling to collect the precipitated plurality of aggregated metal nanoparticles, while the acidic supernatant is discarded. Centrifugation can be carried out at about 3000 rotations per minute (rpm) to about 7500 rpm, such as about 4000 rpm to about 6000 rpm, such as about 5000 rpm for a time period ranging from about 60 seconds to about 180 seconds, such as from about 90 seconds to about 150 seconds, such as about 120 seconds.

Thereafter, in step 810, the precipitated plurality of aggregated metal nanoparticles can be suspended in a buffer solution such as phosphate buffered saline to form the marking solution of the present invention, which is in the form of a colloidal metal nanoparticle suspension.

Then in step 812, a hydrated tissue specimen that is to be subjected to one or more mechanical testing protocols can be soaked in the colloidal metal nanoparticle suspension so that the aggregated metal nanoparticles form a random speckle pattern on the surface of the hydrated tissue specimen. The resulting random speckle pattern includes speckles having a size of about 3 pixels to about 5 pixels, which the present inventors have found is a pixel range desirable for optimized digital image correlation.

Lastly, in step 814, the hydrated tissue specimen having the random speckle pattern on its surface can be mounted on a test bed of any suitable mechanical testing system, where the hydrated tissue specimen can then be subjected to one or more mechanical testing protocols and the displacement of the speckles can be tracked via an image capture device to calculate a desired mechanical property (e.g., strain, deformation, etc.).

The present invention may be better understood with reference to the following examples.

Example 1

Method

Colloidal gold particles were synthesized by reducing chloroauric acid ($HAuCl_4$) in ascorbic acid ($C_6H_8O_6$) solution according to the following reaction with vigorous stirring at room temperature (about 23° C.):

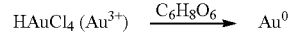

In this method, 125 microliters, 200 microliters, and 250 microliters of 0.1M chloroauric acid was added into 10 milliliters of a 0.3M ascorbic acid ($C_6H_8O_6$) solution under vigorous stirring. The resulting solutions were kept stirring for 15 minutes. The solutions were then incubated at room temperature for up to 96 hours. Gold nanoparticles began to aggregate to form a colloidal gold nanoparticle suspension and eventually the size of the aggregated nanoparticles could be tuned in the range of 1 micrometer to 10 micrometers for the nanoparticles formed from the 125 microliter 0.1M chloroauric acid solution, while the aggregated nanoparticles formed from the 200 microliter and 250 microliter 0.1M chloroauric acid solutions formed aggregated nanoparticles ranging in size from 1 micrometer to 100 micrometers. Table 1 below shows the average particle sizes for individual nanoparticles in the aggregate for each of the three solutions at 1 day (24 hours), 2 days (48 hours), and 3 days (72 hours).

TABLE 1

| | Unit Particle Size Distribution (Nanometers) of Individual Gold Nanoparticles | | |
|---|---|---|---|
| Sample | Solution 1 (125 μL $HAuCl_4$) | Solution 2 (200 μL $HAuCl_4$) | Solution 3 (250 μL $HAuCl_4$) |
| Day 1-1 | 80.8 | 80.8 | 128 |
| Day 1-2 | 94.3 | 108 | 155 |
| Day 1-3 | 108 | 135 | 182 |
| Day 1-4 | 114 | 135 | 209 |
| Day 1-5 | 135 | 162 | 229 |
| Day 1-6 | 155 | 175 | 267 |
| Day 1 Average | 114.52 | 132.63 | 195 |
| Day 2-1 | 95.2 | 94.3 | 155 |
| Day 2-2 | 108 | 108 | 175 |
| Day 2-3 | 141 | 128 | 181 |
| Day 2-4 | 148 | 151 | 189 |
| Day 2-5 | 168 | 162 | 195 |
| Day 2-6 | 175 | 162 | 215 |
| Day 2 Average | 139.2 | 134.22 | 185 |
| Day 3-1 | 87.5 | 87.5 | 155 |
| Day 3-2 | 114 | 108 | 155 |
| Day 3-3 | 121 | 128 | 175 |
| Day 3-4 | 141 | 135 | 182 |
| Day 3-5 | 148 | 135 | 209 |
| Day 3-6 | 189 | 168 | 220 |
| Day 3-Average | 133.42 | 126.92 | 182.67 |
| Overall Average | 129.04 | 131.26 | 187.56 |

After the colloidal gold nanoparticle aggregates were formed to the desired size, the suspensions were then centrifuged (5000 rpm for 2 minutes) or allowed to precipitate by gravitational settling to remove the acidic supernatant, and the remaining precipitated gold particles were resuspended in a phosphate-buffered saline (PBS) solution. The resulting suspension was then centrifuged a second time (5000 rpm for two minutes) to completely remove any acidic traces in solution, and the remaining precipitated gold particles were then resuspended in a PBS solution. The tissue specimens (mouse aorta samples) were then soaked in the colloidal gold particle suspension. Due to coordinate covalent and hydrophobic interactions, spontaneous adsorption of gold particles onto the tissue surface occurs to form a random speckle pattern. The patterned specimen was then mounted on a Bose mechanical test bed to conduct uniaxial mechanical tensile tests where a digital camera that includes a charge-coupled device (CCD) tracks the displacement of the speckle pattern on the specimen. Deformations and strains were then analyzed using VIC-2D software developed by the University of South Carolina for DIC. This software maps spatial locations in an undeformed reference state to locations in images taken at various stages of deformation by comparing (correlating through an optimization algorithm) pixel gray scale intensities in a sequence of small sub areas of the full digital image. For example, the spatial locations correspond to the light scattered from aggregated gold nanoparticles in the form of a random pattern of speckles located at different places in the image, and pixels are either white (no speckles or nanoparticles in that location) or grey (speckles or nanoparticles present in that location). As the speckles in the form of the described aggregated gold nanoparticles move in concert with the tissue specimen onto which they are applied, the positions of the scattered light "pixels" are displaced. Displacements can then be measured directly from this mapping. The software then constructs a smooth surface through the displacement field and approximates strains, which are gradients of displacements and are dimensionless, by differentiating this surface. The Lagrangian (non-linear) strains, $\gamma_{ij} = (½)((\partial u_i/\partial X_j) + (\partial u_j/\partial X_i) + (\partial u_k/\partial X_i)(\partial u_k/\partial X_j))$, (summed over k) where $\gamma_{ij}$ are the components of the strain tensor in the plane, u=x−X is the displacement vector, defined as the change between the deformed position $x=(x_1, x_2, x_3)$ and the reference position $X=(X_1, X_2, X_3)$ are then calculated, which makes the method appropriate for biological materials which are likely to experience large strains.

As shown in this Example, the individual gold nanoparticle size and the gold nanoparticle aggregate particle size could be controlled by varying the initial volume of chloroauric acid relative to the ascorbic acid as well as the aggregation time. For digital image correlation, the particle size was chosen so that each particle occupied roughly 3 pixels to 5 pixels in each direction at the image plane of the camera used during DIC to allow for optimum pattern tracking in the imaging system. Thus, the method allows for production of a speckle pattern that can be varied in size depending on the specimen to be imaged and the imaging system.

Figure 2A:
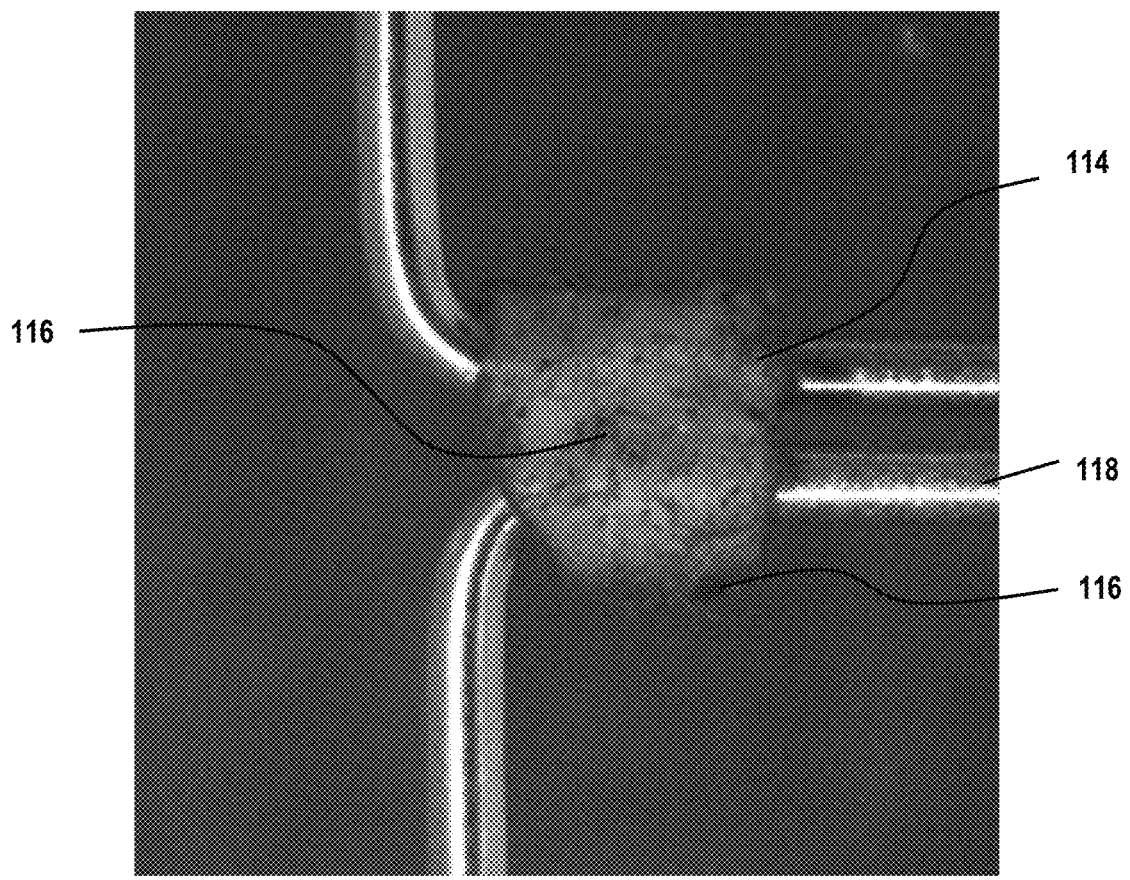
FIG. 2a is a photograph illustrating a hydrated tissue specimen containing a random speckle pattern of a plurality of aggregated metal nanoparticles.
Figure 2B:
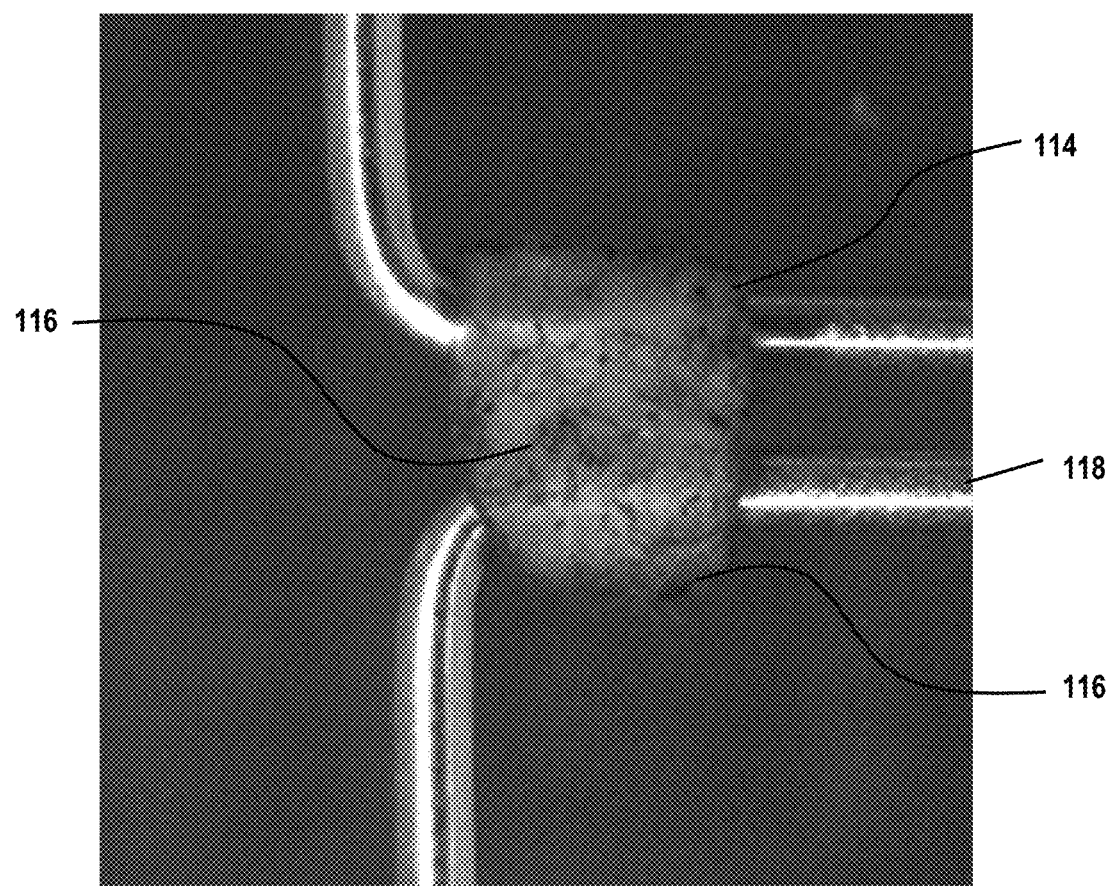
FIG. 2b is a photograph illustrating the hydrated tissue specimen of FIG. 2a after it has been subjected to a uniaxial mechanical testing protocol, where movement of the speckle pattern of the plurality of aggregated metal nanoparticles can be tracked to determine the amount of deformation and/or strain exhibited by the hydrated tissue specimen.

FIG. 2a is a photograph illustrating a hydrated tissue specimen (mouse aorta) containing a random speckle pattern of a plurality of aggregated gold nanoparticles in the form of colloidal suspension, where the mechanical testing apparatus chamber (e.g., a Bose mechanical test bed) is filled with PBS, and FIG. 2b is a photograph illustrating the hydrated tissue specimen of FIG. 2a after it has been subjected to a uniaxial mechanical testing protocol, where movement of the speckle pattern of the plurality of aggregated metal nanoparticles can be tracked to determine the amount of deformation and/or strain exhibited by the hydrated tissue specimen.

Figure 3A:
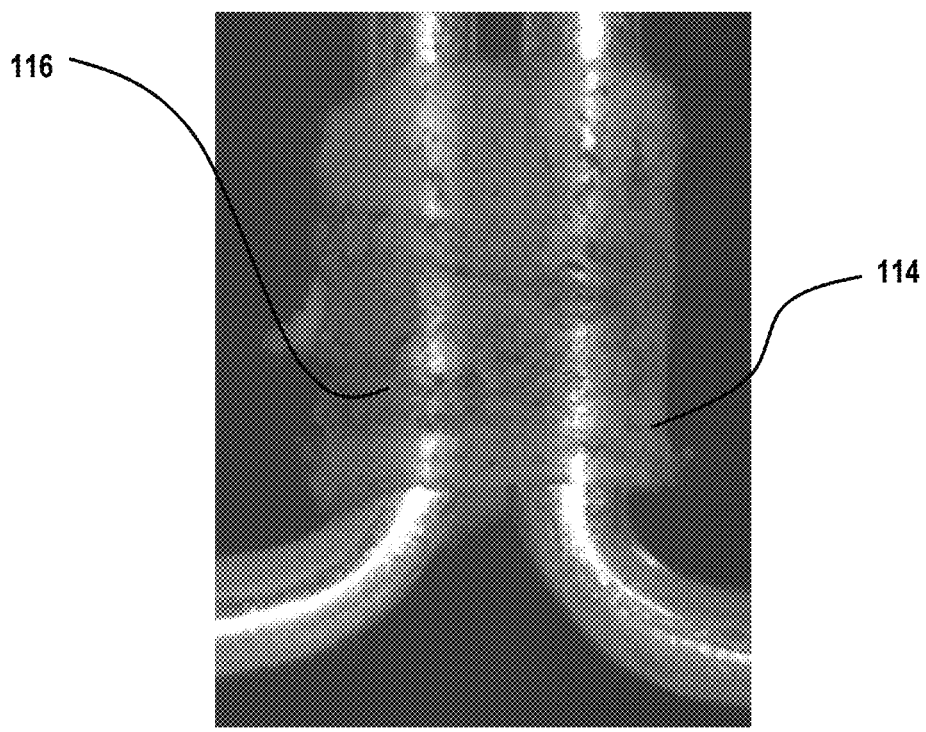
FIG. 3a illustrates a hydrated tissue specimen marked with a random speckle pattern of the aggregated metal nanoparticles of the present invention.
Figure 3B:
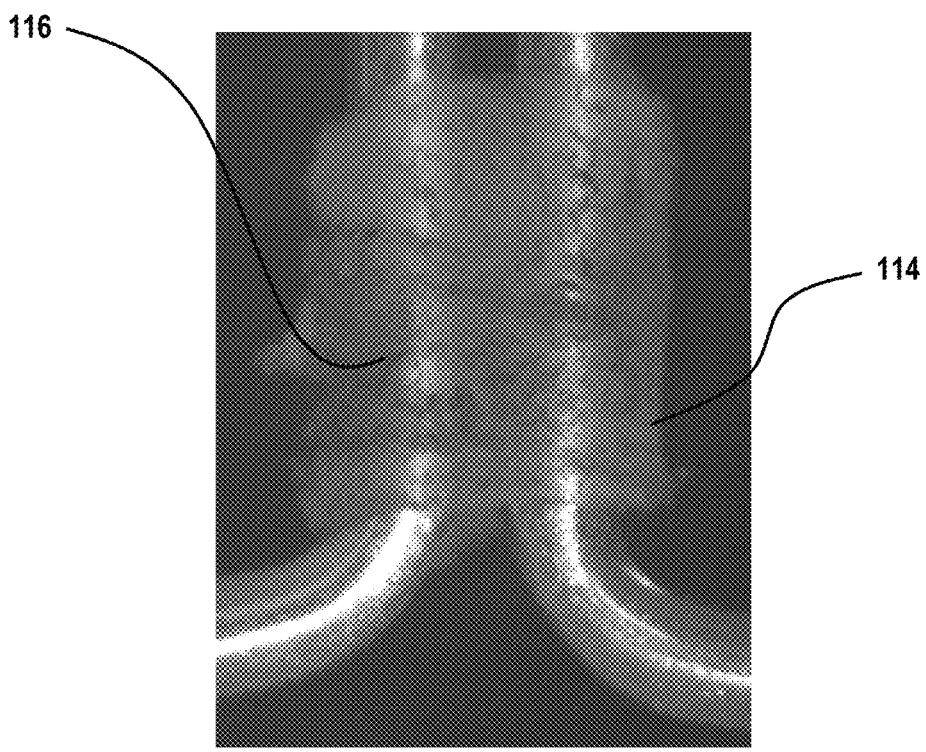
FIG. 3b illustrates the hydrated tissue specimen of FIG. 3a after the tissue specimen has been submerged in phosphate buffered saline for 1 hour, indicating that the random speckle pattern is still stable.
Figure 4:
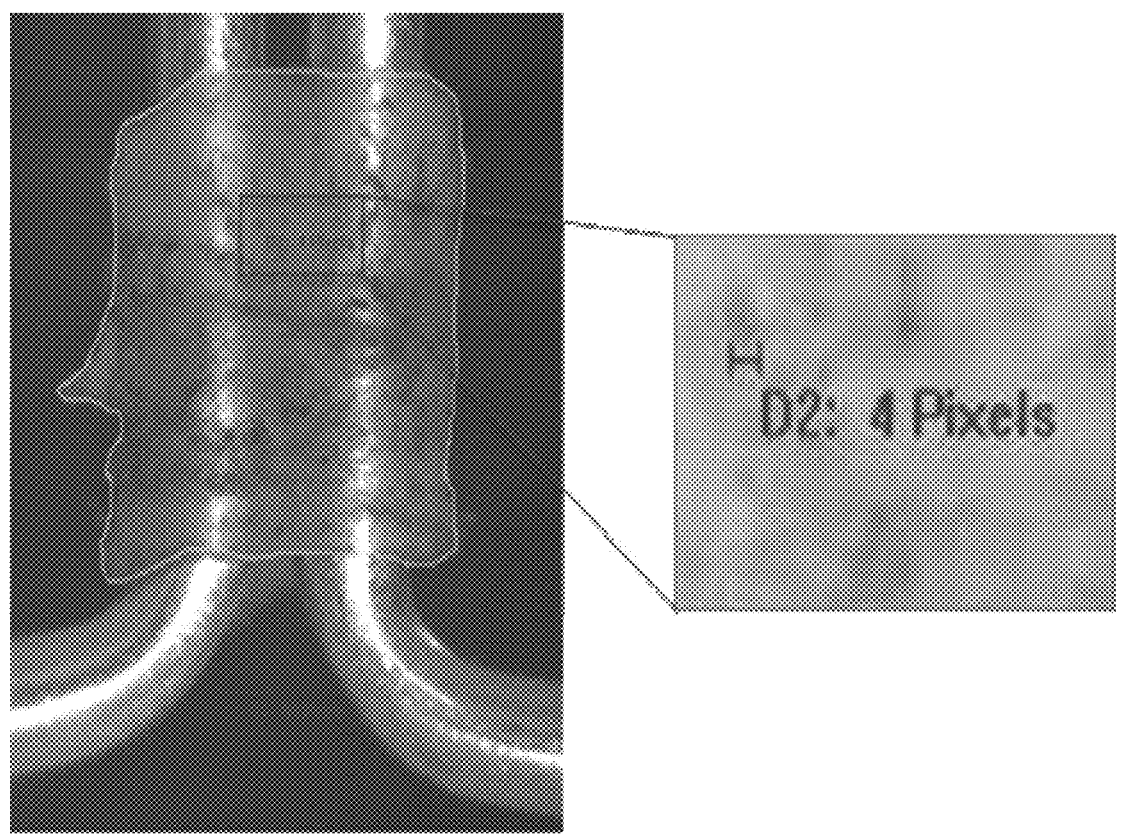
FIG. 4 is an image illustrating a desired speckle size of 3-5 pixels on the hydrated tissue specimen of FIG. 3a for each of the speckles in the random speckle pattern.
Figure 5:
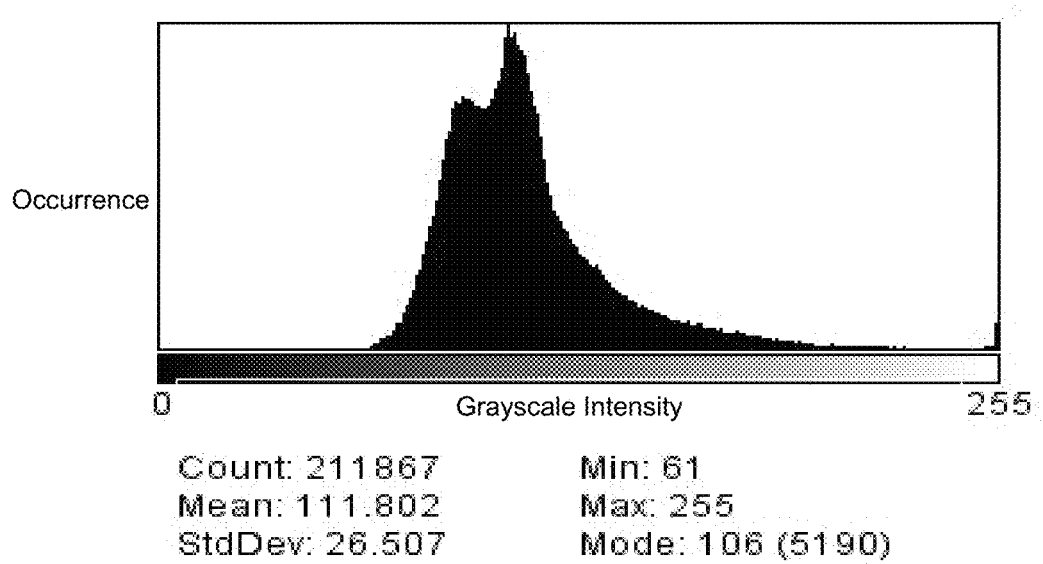
FIG. 5 is a graph illustrating the grayscale intensity of the tissue specimen (outlined in yellow) of FIG. 3a, where the gray value is between 60 and 255, indicating a sufficient level of contrast between the hydrated tissue specimen and the 3-5 pixel random speckle pattern for reliable image matching.

FIG. 3a illustrates the hydrated tissue specimen marked with the random speckle pattern, while FIG. 3b illustrates the hydrated tissue specimen of FIG. 3a after the tissue specimen has been submerged in phosphate buffered saline for 1 hour, indicating that the random speckle pattern is still stable with no cracking or delamination. Further, FIG. 4 shows a zoomed-in view of the appropriate speckle size (e.g., between 3-5 pixels, or about 4 pixels) for the speckles in the random speckle pattern present on the hydrated tissue specimen of FIG. 3a. In addition, FIG. 5 is a histogram-type graph illustrating the grayscale intensity of the tissue specimen outlined in yellow of FIG. 3a, where the gray value is between 60 and 255, indicating a sufficient level of contrast between the hydrated tissue specimen and the random speckle pattern for reliable image matching.

Figure 6A:
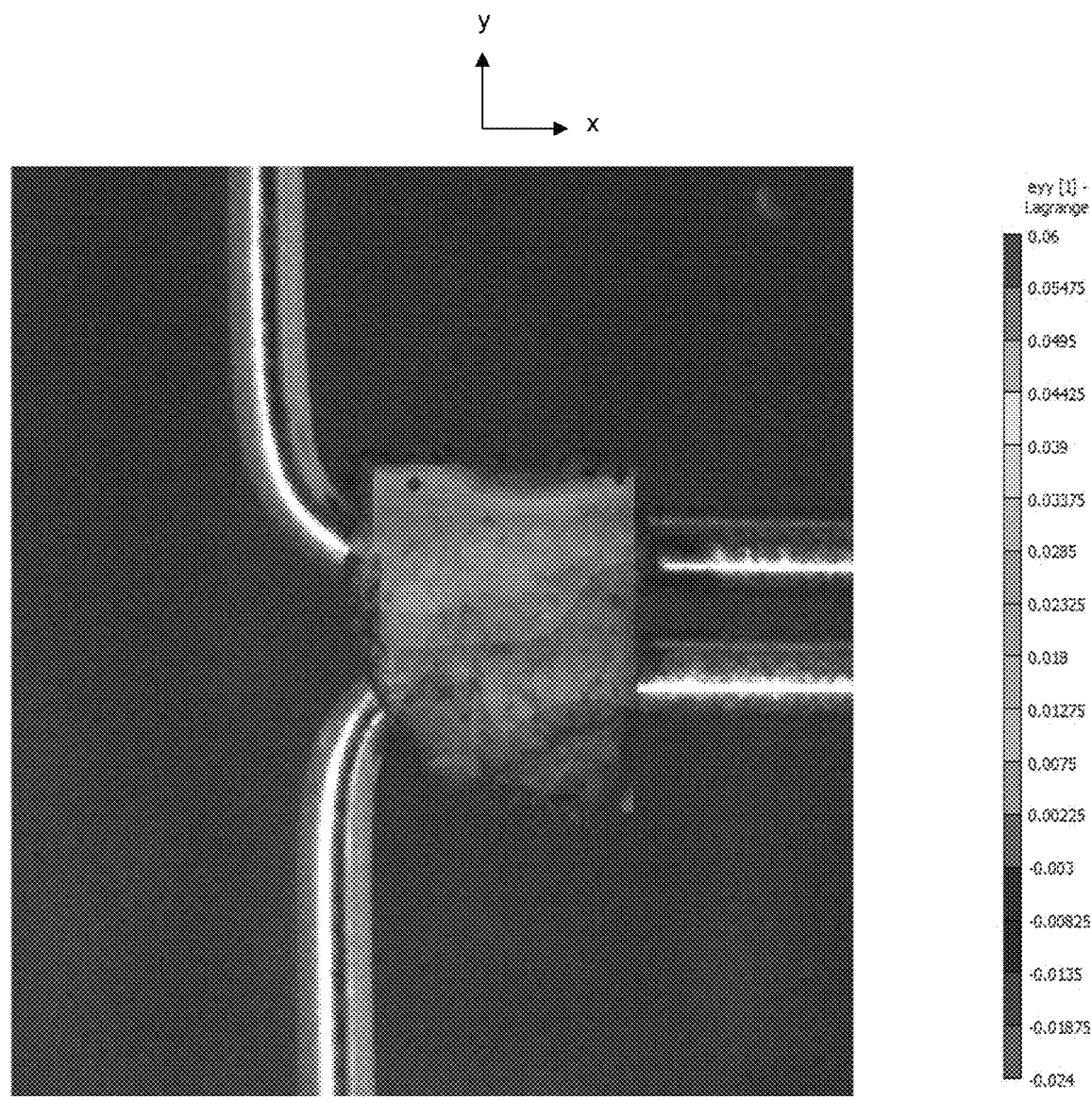
FIGS. 6a and 6b are images showing the strain analysis of a hydrated tissue specimen (e.g., a mouse aorta) to which the random speckle pattern of the present invention has been applied.
Figure 6B:
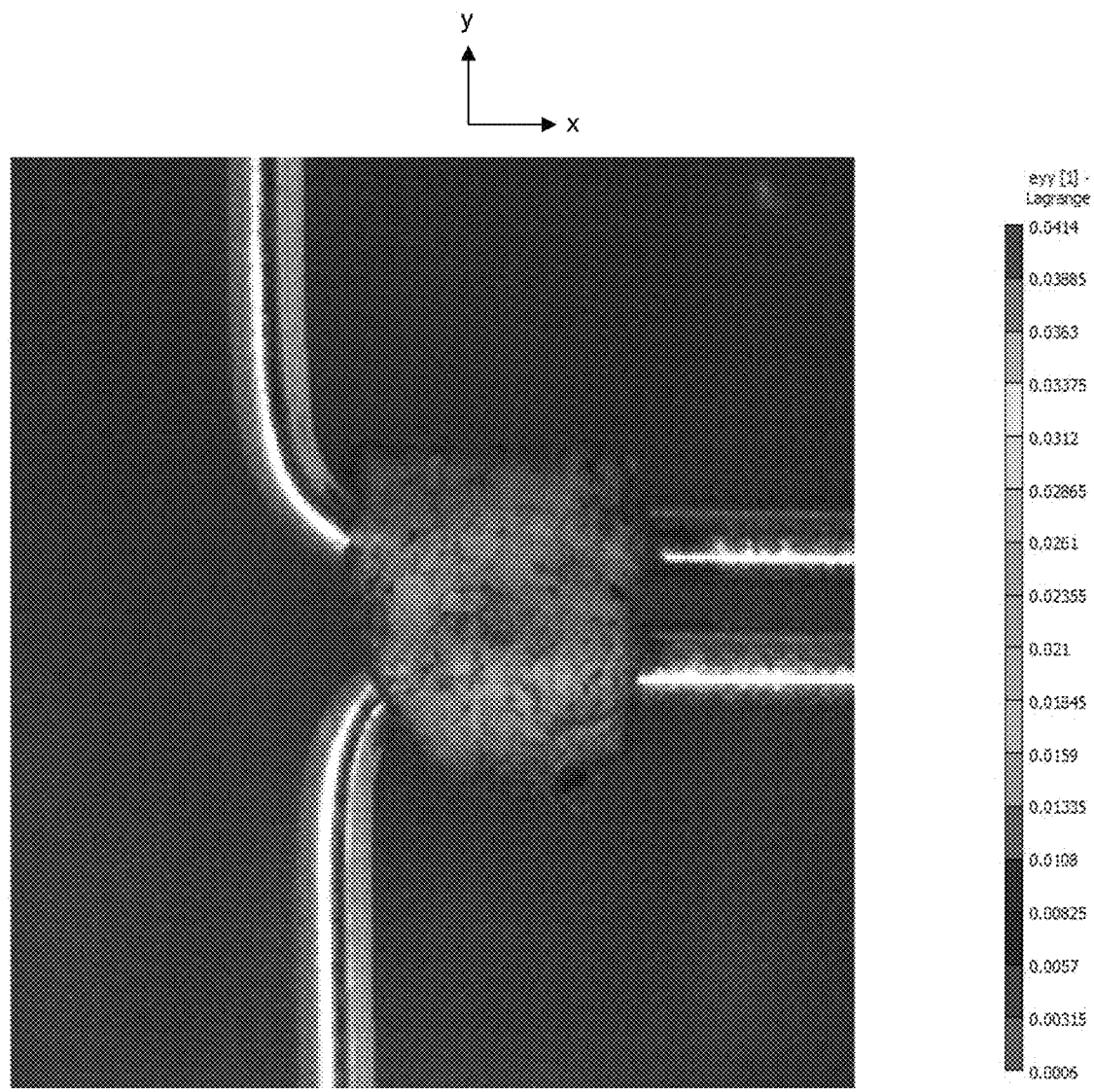

FIGS. 6a and 6b are images showing the strain analysis of a hydrated tissue specimen (e.g., a mouse aorta to which the random speckle pattern of the present invention has been applied) during mechanical tensile testing by VIC-2D. Strain measurements of mouse aorta to which the random speckle pattern of the present invention has been applied. FIG. 8a shows the strain measurements obtained over the entire specimen, while FIG. 8b shows the strain measurements obtained over the central region in the y-direction ($\varepsilon_{yy}$) during a uniaxial tensile test. In FIG. 8a, $\varepsilon_{yy}$ is not uniform on the sample due to bending and friction at the arms during deformation. Thus, the local strain can be obtained from the central region as shown in FIG. 8b.

Figure 7A:
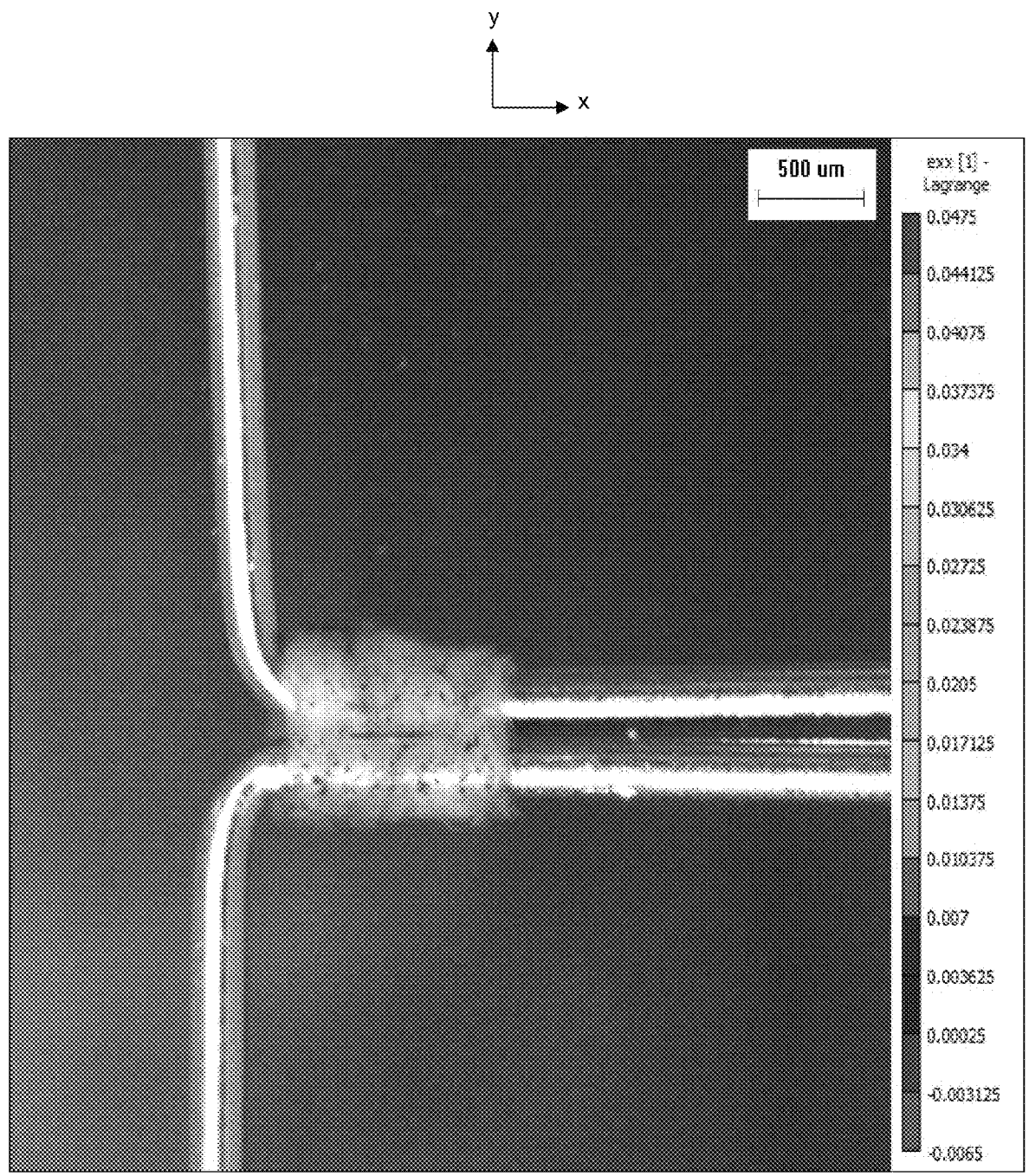
FIGS. 7a, 7b, and 7c are images showing the system error analysis—strain analysis of stationary mouse aorta in the xx, yy, and xy directions.
Figure 7B:
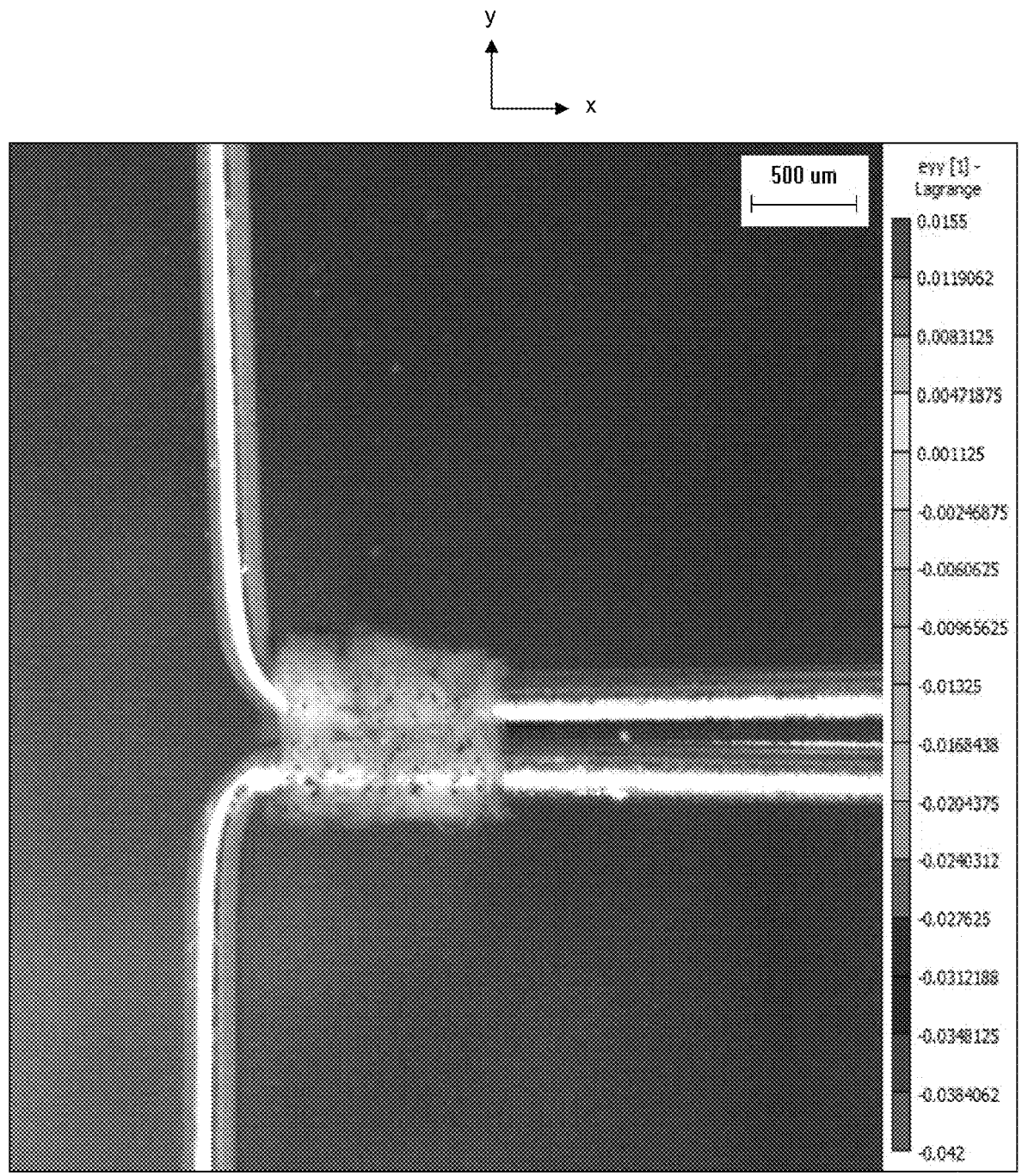
Figure 7C:
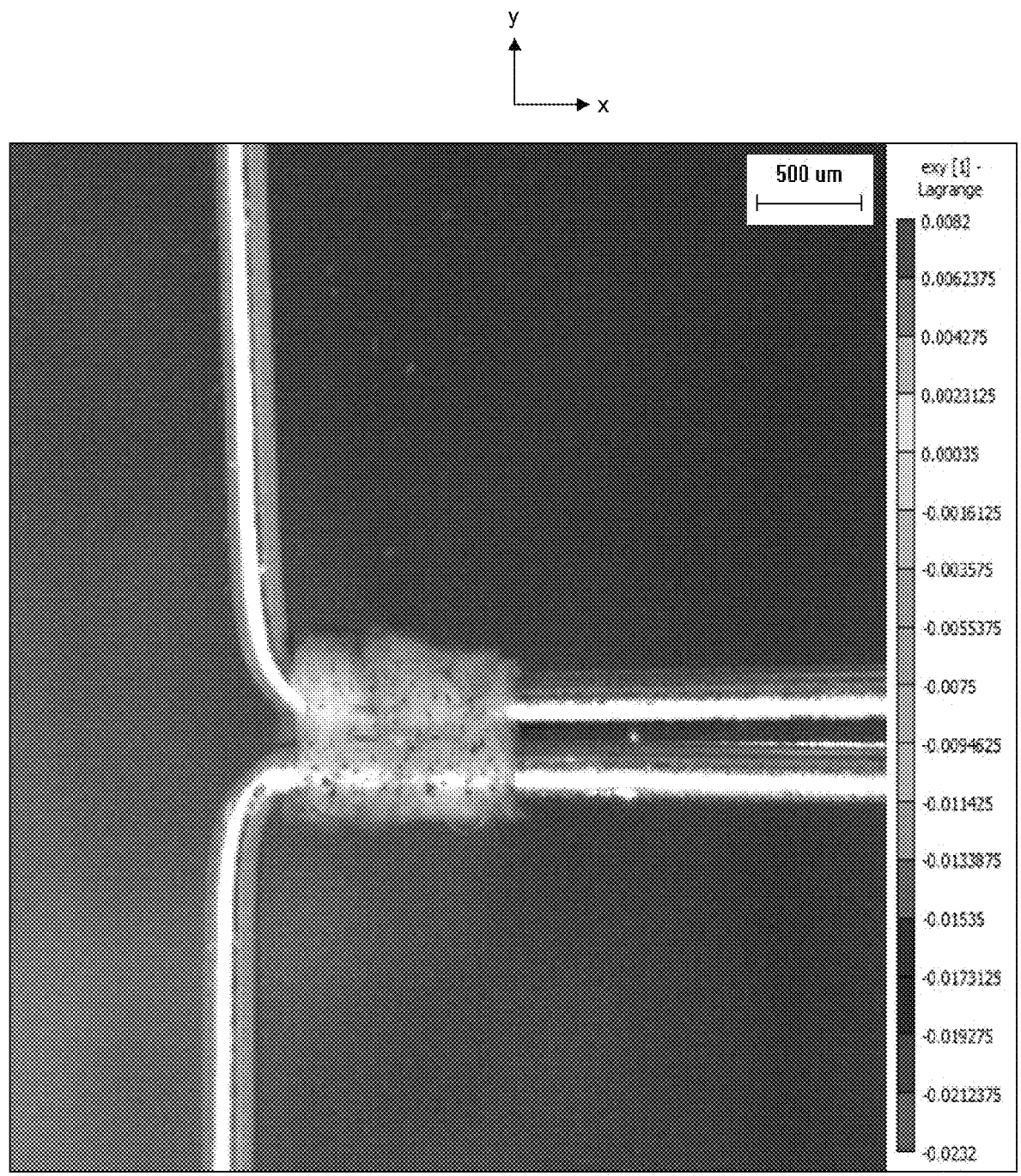

FIGS. 7a, 7b, and 7c are images showing the error analysis (system error) during the strain analysis ($\varepsilon_{xx}$, $\varepsilon_{yy}$, and $\varepsilon_{zz}$) of stationary mouse aorta in a Bose mechanical testing apparatus set-up. Ten consecutive images of stationary mouse aorta on which the random speckle pattern of the present invention was applied were captured and analyzed in VIC-2D (Correlated Solutions, Inc.) for system error analysis. Then, the mean, median, and standard deviation of pseudo strain data ($\varepsilon_{xx}$, $\varepsilon_{yy}$, and $\varepsilon_{zz}$) were obtained and illustrated in FIGS. 7a, 7b, and 7c, respectively. The error analysis data is shown below in Table 2.

TABLE 2

| Strain Error Analysis | | | |
|---|---|---|---|
| | $\varepsilon_{xx}$ | $\varepsilon_{yy}$ | $\varepsilon_{xy}$ |
| Mean ε | 0.00228 | −0.00065 | −0.00435 |
| Median ε | −0.00357 | 0.00430 | −0.00643 |
| Standard Deviation | 0.01134 | 0.01254 | 0.00666 |

Example 2

Method

Colloidal gold particles were synthesized by reducing chloroauric acid (HAuCl$_4$) in ascorbic acid (C$_6$H$_8$O$_6$) solution according to the following reaction with vigorous stirring at room temperature (about 23° C.):

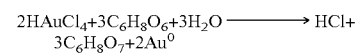

In this method, 0.001M to 0.0025M chloroauric acid (HAuCl$_4$) was added to 0.1M to 0.3M ascorbic acid (C$_6$H$_8$O$_6$) solution under vigorous stirring at room temperature. At time periods of 0 hours, 12 hours, 24 hours, 48 hours, and 72 hours, a stabilizer (e.g., gum arabic) was added to the mixture of the chloroauric acid and ascorbic acid at a concentration of 0.25 wt. % based on the total weight of the mixture, and a control sample with no stabilizer was maintained as well. The particles were allowed to settle (e.g., gravitational settling), and the gold aggregates were then resuspended in phosphate buffered saline (PBS), after which a small section of mouse aorta was submerged in the suspension so that a speckle pattern of gold particles could be adsorbed to the surface of the mouse aorta. Then the mouse aorta was subjected to mechanical testing and strain analysis during a uniaxial failure test (Bose Electro-Force 5100) with a CCD camera for image acquisition. Strain analysis was performed using the VIC-2D software from Correlated Solutions, Inc. in the same manner as described above for Example 1.

Figure 9A:
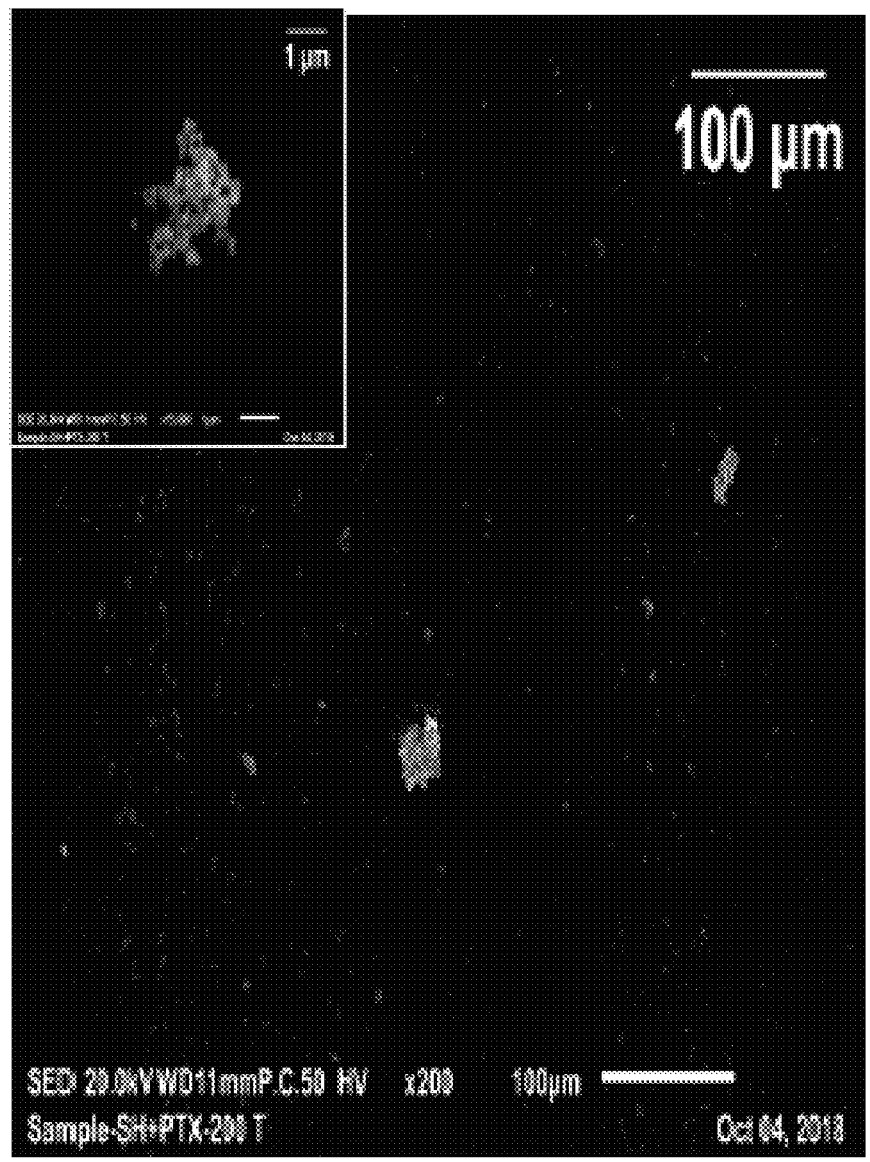
FIGS. 9a, 9b, 9c, 9d, 9e, and 9f are scanning electron microscopy (SEM) images of a plurality of aggregated gold nanoparticles from three formulations using different concentrations of the metal precursor solution and reducing agent solution at the initial preparation (Day 1) and after complete precipitation (Day 3).
Figure 9B:
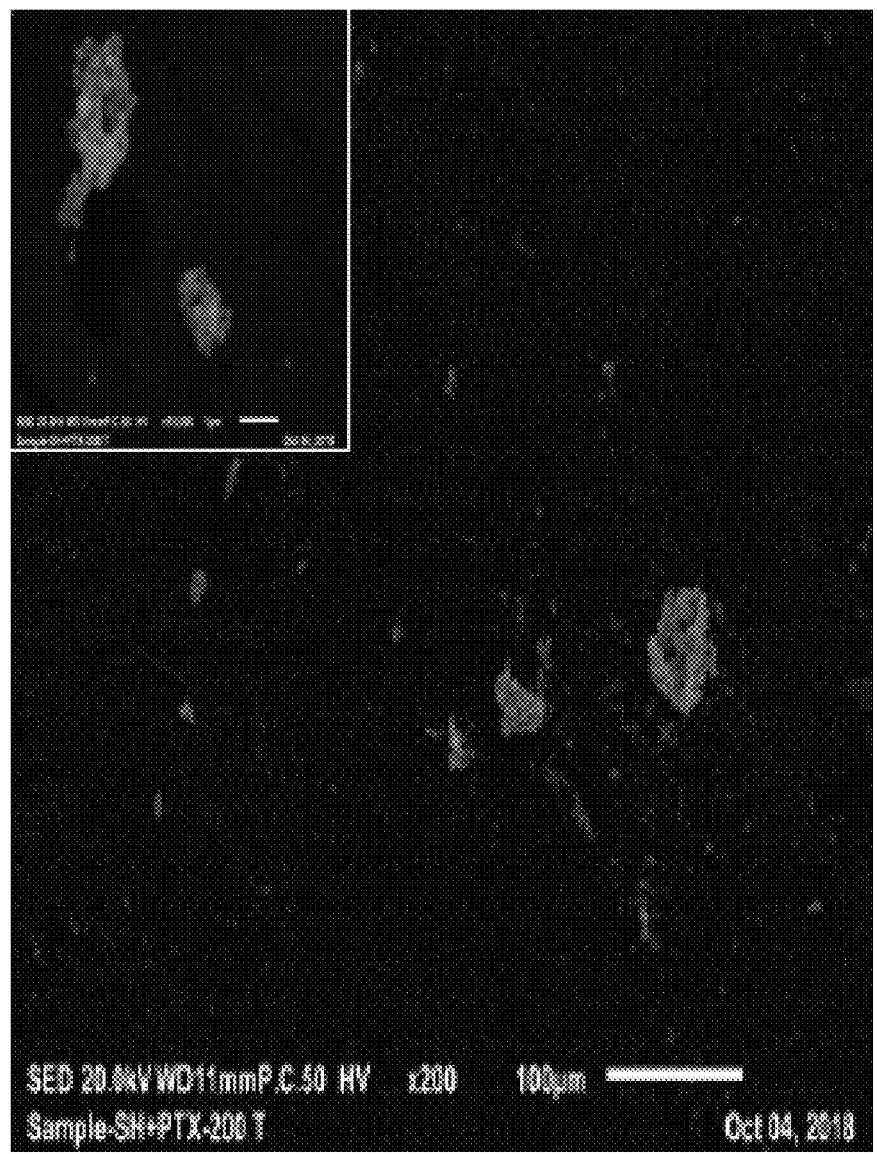
Figure 9C:
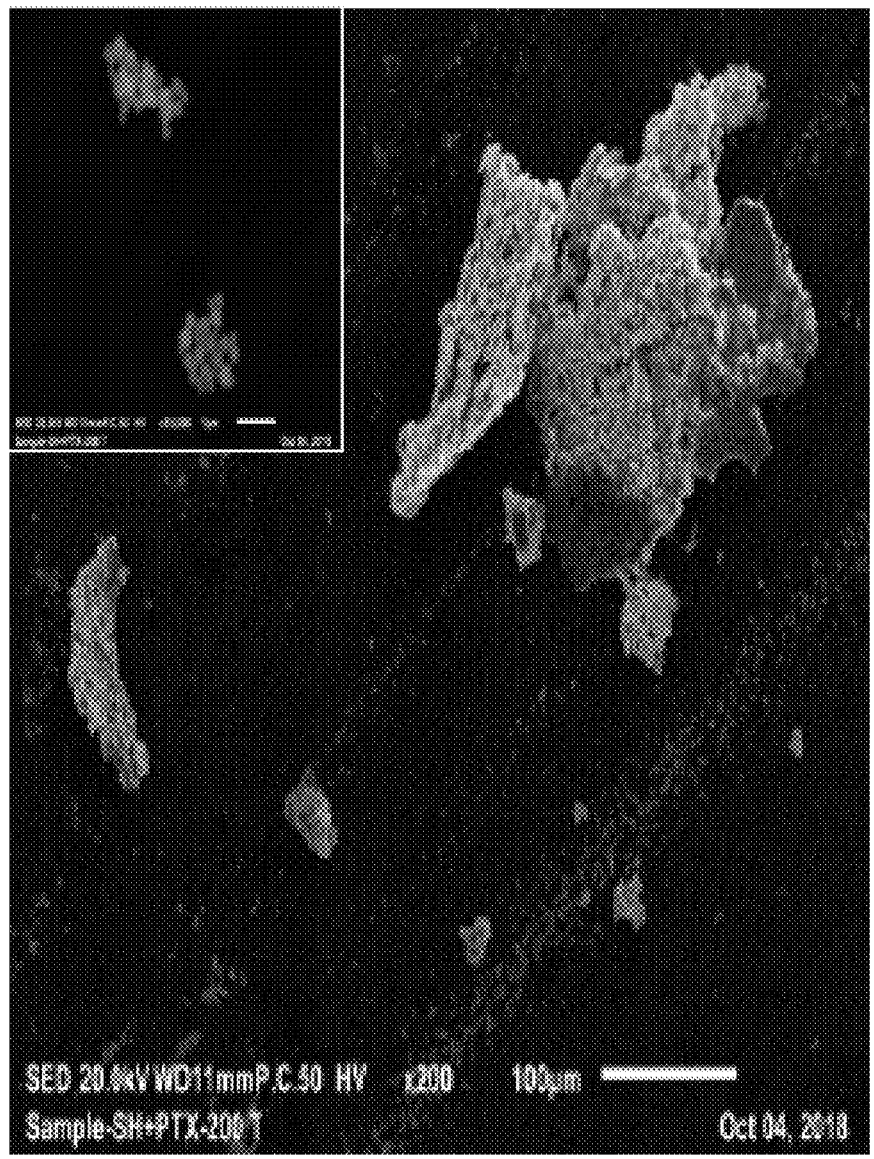
Figure 9D:
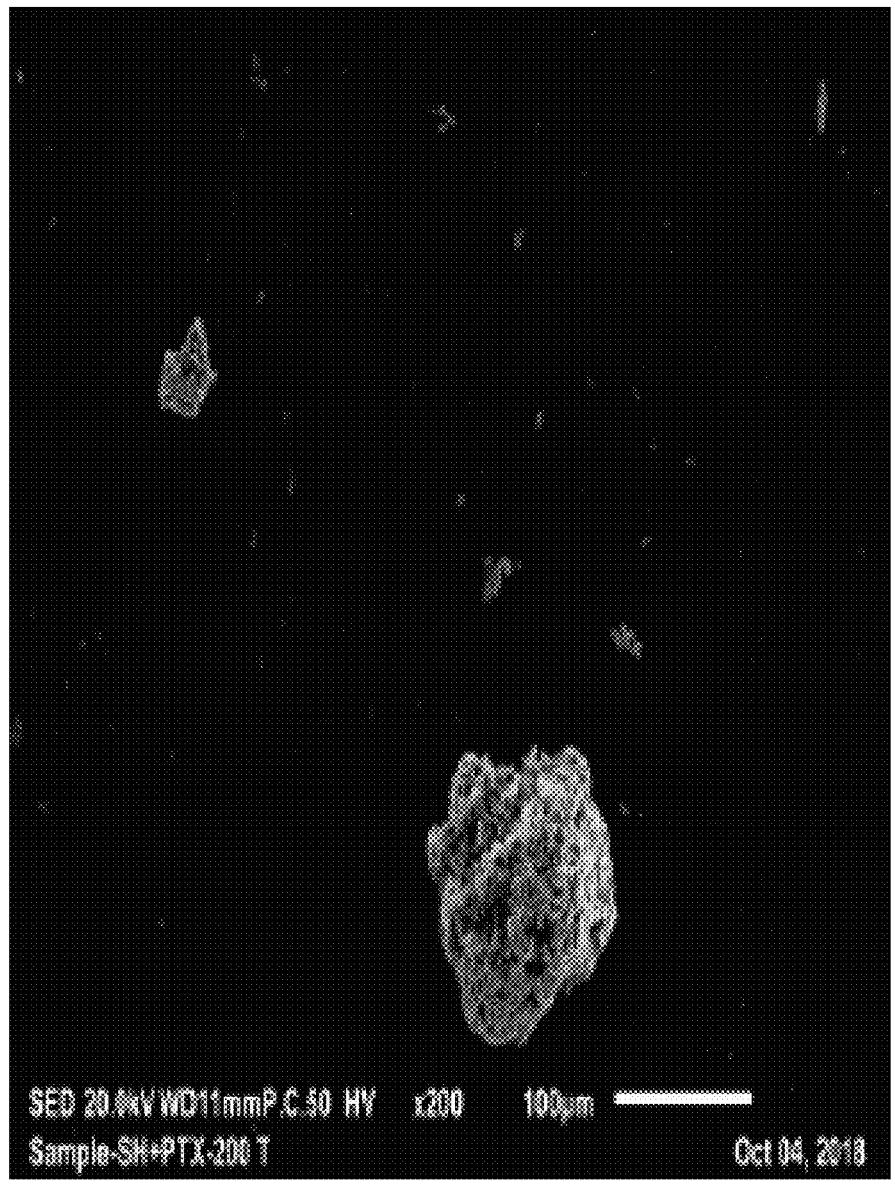
Figure 9E:
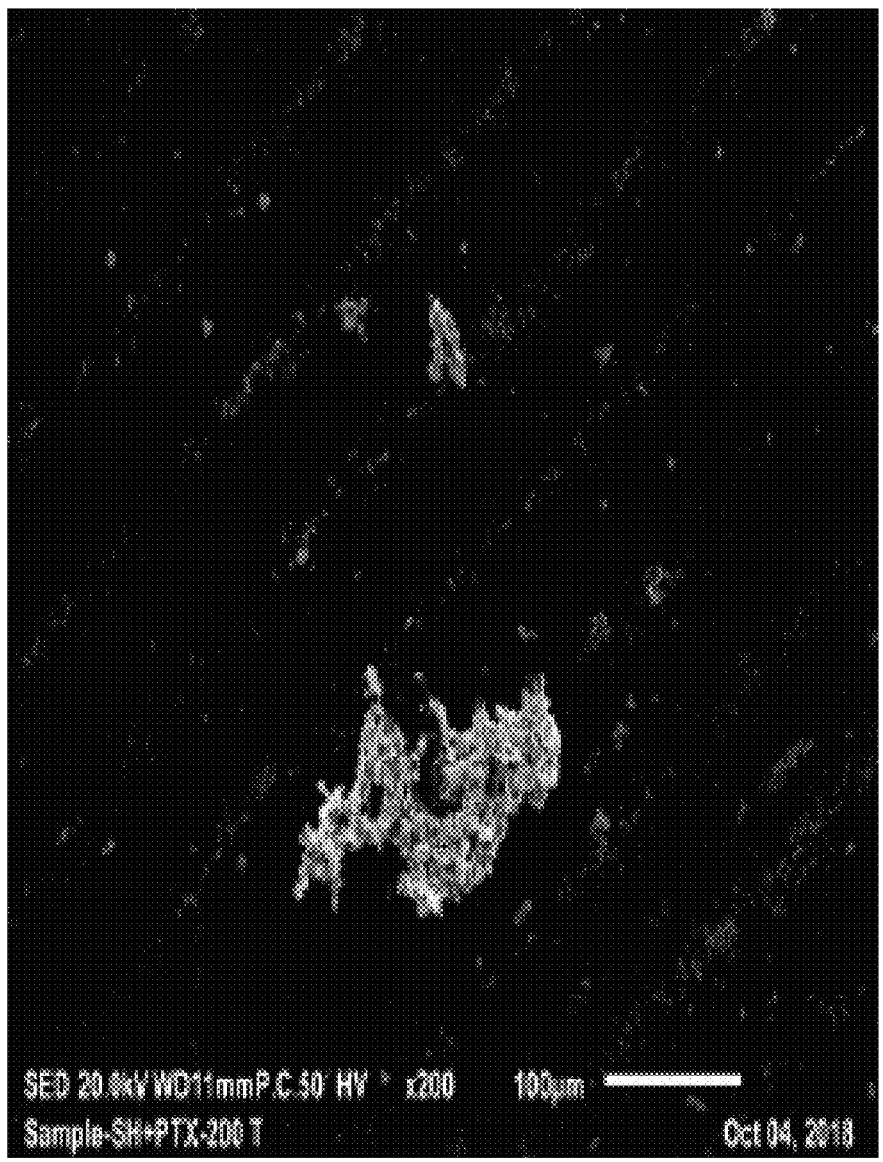
Figure 9F:
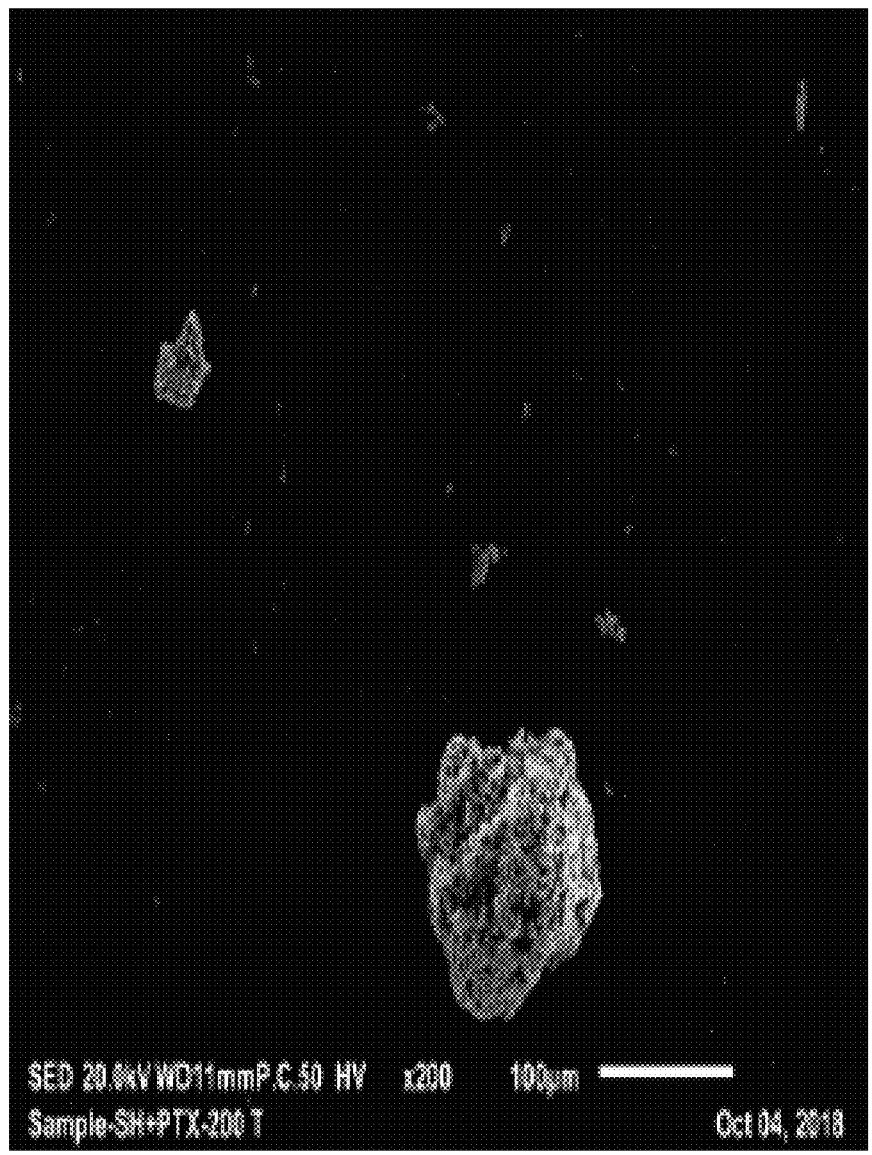

FIGS. 9a, 9b, 9c, 9d, 9e, and 9f illustrate SEM images of colloidal gold nanoparticle aggregates using different concentrations of gold nanoparticle precursor solution ($HAuCl_4$). FIGS. 9a, 9b, and 9c are images taken on the day of initial preparation (Day 1), while FIGS. 9d, 9e, and 9f are images taken on Day 3 after complete precipitation. Meanwhile, FIGS. 9a and 9d show aggregates formed using 0.001M $HAuCl_4$, FIGS. 9b and 9e show aggregates formed using 0.002M $HAuCl_4$, and FIGS. 9c and 9f show aggregates formed using 0.0025M $HAuCl_4$. As shown from a comparison of the various SEM images, increasing the $HAuCl_4$ concentration increases the particle size of the plurality of gold nanoparticle aggregates, and a low concentration (e.g., 0.001M) of $HAuCl_4$ yields optimally sized colloidal gold aggregates.

Figure 10:
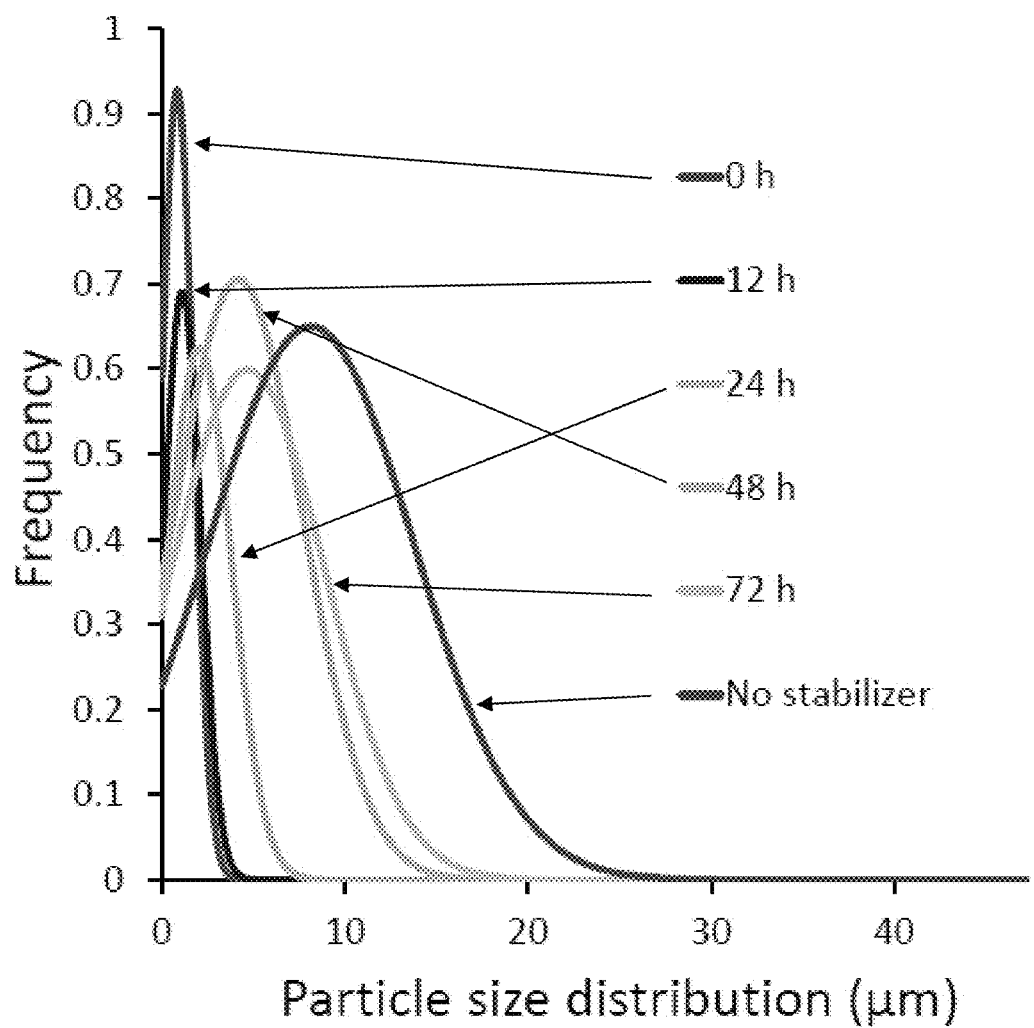
FIG. 10 is a graph illustrating the size distribution analysis for a plurality of aggregated gold nanoparticles formed with the addition of a stabilizer at 0 hours, 12 hours, 24 hours, 48 hours, and 72 hours after combining the metal precursor solution with the reducing agent solution, as compared to a control mixture to which no stabilizer was added.

FIG. 10 and Table 3 below show the average particle sizes for the plurality of aggregated gold nanoparticles with no stabilizer, or a stabilizer added at 0 hours, 12 hours, 24 hours, 48 hours, or 72 hours after formation of the mixture containing the 0.1M, 0.2M, or 0.3M of the reducing agent solution ($C_6H_8O_6$) and the 0.001M of the gold nanoparticle precursor solution ($HAuCl_4$).

TABLE 3

| $C_6H_8O_6$ | Particle Size Distribution (Mean Size, Standard Deviation) of Gold Nanoparticle Aggregates (Micrometers) | | | | | |
|---|---|---|---|---|---|---|
| | Time Before Adding Stabilizer | | | | | |
| Concentration | 0 hours | 12 hours | 24 hours | 48 hours | 72 hours | No Stabilizer |
| 0.1M | 0.6 ± 0.4 | 1.2 ± 1.2 | 3.0 ± 5.0 | 4.0 ± 4.6 | 5.3 ± 5.4 | 6.5 ± 7.0 |
| 0.2M | 0.8 ± 0.9 | 1.1 ± 1.0 | 2.1 ± 1.7 | 4.2 ± 3.5 | 4.7 ± 4.2 | 8.1 ± 5.6 |
| 0.3M | 0.9 ± 1.3 | 2.9 ± 3.9 | 4.1 ± 5.5 | 5.2 ± 3.7 | 6.9 ± 6.0 | 9.3 ± 6.4 |

As can be shown from Table 3 above, the desired particle size for the gold nanoparticle aggregates could be controlled in a narrow range based on the reducing agent concentration and the addition of a stabilizer at a particular time point. Moreover, referring to FIG. 10, it is observed that increasing the time before adding a stabilizer corresponds with an increase in particle size of the gold nanoparticle aggregates, where the gold nanoparticle aggregates in FIG. 10 were formed using a 0.001M solution of chloroauric acid ($HAuCl_4$) and a 0.2M solution of ascorbic acid ($C_6H_8O_6$).

Figure 11A:
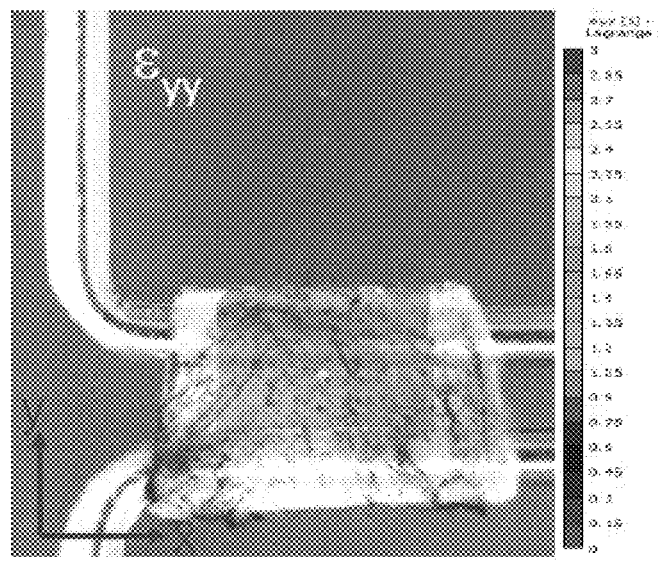
FIGS. 11a, 11b, 11c, 11d, 11e, and 11f are images showing the strain measurement during uniaxial tensile testing of patterned mouse aorta in the y and x directions.
Figure 11B:
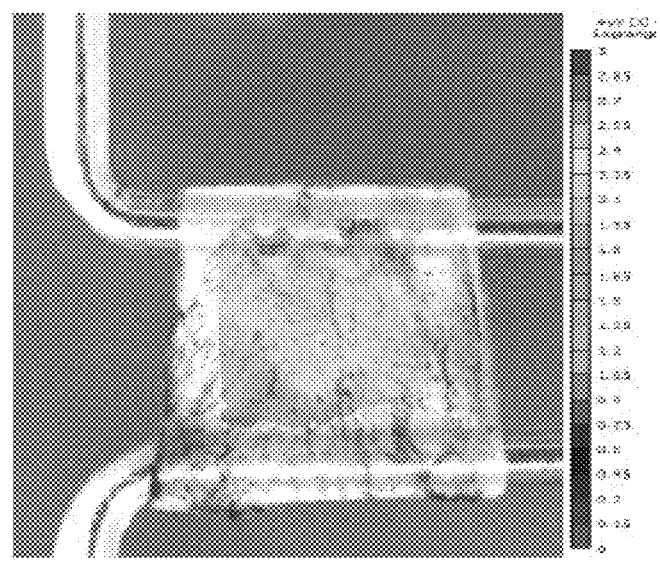
Figure 11C:
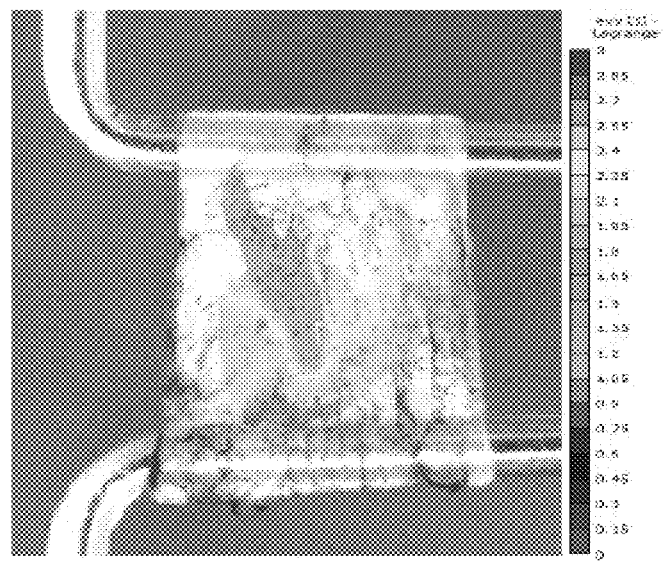
Figure 11D:
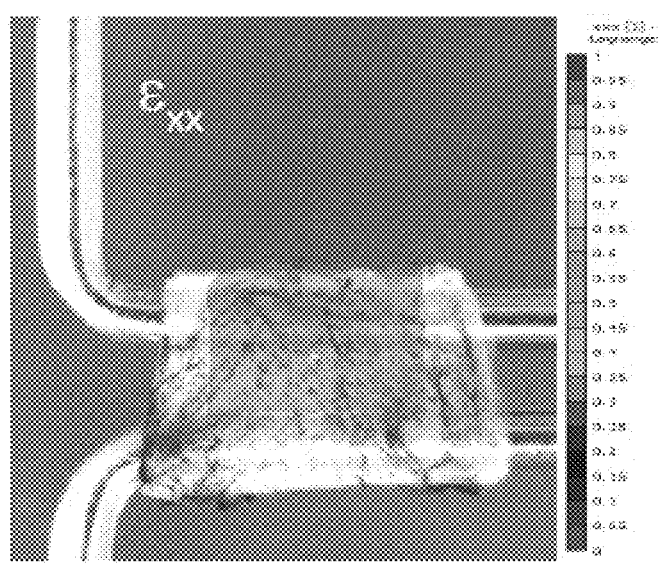
Figure 11E:
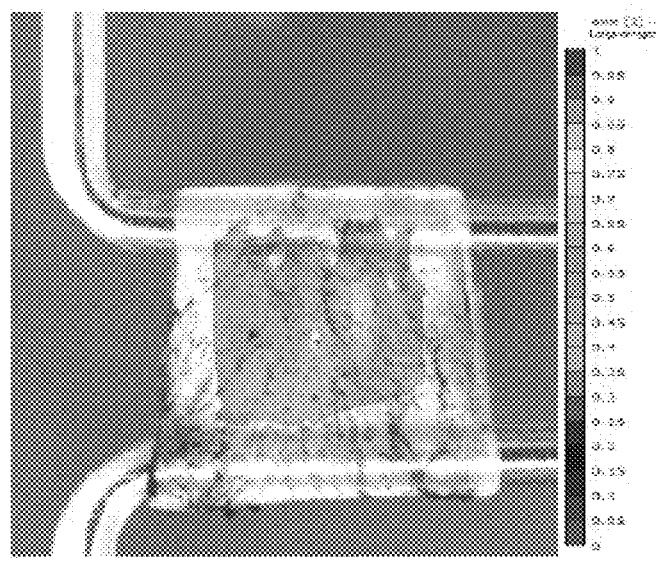
Figure 11F:
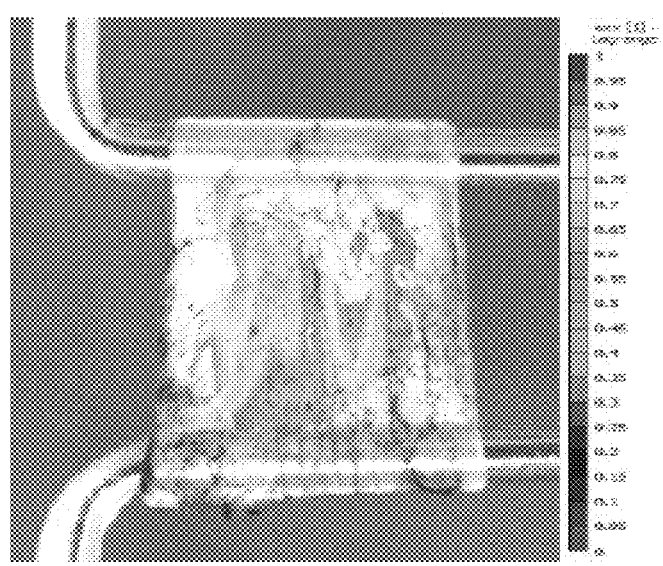

Referring now to FIGS. 11a, 11b, 11c, 11d, 11e, and 11f, the strain measurement of mouse aorta patterned with the speckle pattern of gold nanoparticle aggregates formed by the method of Example 2 were obtained during mechanical tensile testing by VIC-2D. FIGS. 11a, 11b, and 11c show the progression of strain component $\varepsilon_{yy}$ over time in the y-direction, while FIGS. 11d, 11e, and 11f show the progression of strain component $\varepsilon_{xx}$ over time in the x-direction. Specifically, FIGS. 11a and 11d correspond to the early stage of extension testing where only small displacements are seen, FIGS. 11b and 11e illustrate the strain field data during the middle stage of extension testing, and FIGS. 11c and 11f illustrate the patterned samples being stretched almost to the point of failure. In FIG. 11b, $\varepsilon_{yy}$ is not uniform on the sample due to bending and friction at the arms during deformation. Based on these results, it is feasible to obtain the local strain field of mouse aorta using the methods and speckle pattern solutions contemplated by the present invention during uniaxial mechanical extension up to the point of material failure.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed is:

1. A method of marking a hydrated tissue specimen for mechanical testing, the method comprising:
    adding a metal nanoparticle precursor solution to a reducing agent solution to form a mixture;
    incubating the mixture to form a plurality of aggregated metal nanoparticles, wherein each of the aggregated metal nanoparticles includes a plurality of individual metal nanoparticles;
    separating the plurality of aggregated metal nanoparticles from a supernatant by means of centrifugation or gravitational settling;
    resuspending the plurality of aggregated metal nanoparticles in a buffer solution to form a colloidal metal nanoparticle suspension; and
    soaking the hydrated tissue specimen in the colloidal metal nanoparticle suspension, wherein at least a portion of the plurality of aggregated metal nanoparticles adhere to the hydrated tissue specimen in a random pattern of speckles.

2. The method of claim 1, wherein each of the plurality of individual metal nanoparticles has a particle size ranging from about 100 nanometers to about 200 nanometers.

3. The method of claim 1, wherein each of the plurality of aggregated metal nanoparticles has a particle size ranging from about 0.75 micrometers to about 100 micrometers.

4. The method of claim 1, wherein the plurality of individual metal nanoparticles comprises gold nanoparticles, silver nanoparticles, nickel nanoparticles, or platinum nanoparticles.

5. The method of claim 1, further comprising:
    subjecting the hydrated tissue specimen to one or more mechanical testing protocols, wherein an image capture device obtains a plurality of images of the hydrated tissue specimen, wherein a displacement of one or more speckles present on the tissue specimen is monitored.

6. The method of claim 1, wherein the metal nanoparticle precursor solution comprises chloroauric acid, silver nitrate, nickel chloride, dihydrogen hexachloroplatinate, or tetraammineplatinum (II) chloride.

7. The method of claim 1, wherein the metal nanoparticle precursor solution has a molarity ranging from about 0.0005M to about 0.15M.

8. The method of claim 1, wherein the reducing agent solution comprises ascorbic acid, sodium citrate, sodium borohydride, ethylene glycol, or hydrazine.

9. The method of claim 1, wherein the reducing agent solution has a molarity ranging from about 0.1M to about 0.4M.

10. The method of claim 1, wherein the metal nanoparticle precursor solution is present in an amount ranging from about 1.01% by volume to about 4% by volume based on a total volume of the mixture.

11. The method of claim 1, wherein the reducing agent solution is present in an amount ranging from about 96% by volume to about 98.99% by volume based on a total volume of the mixture.

12. The method of claim 1, wherein the mixture is incubated for a time period ranging from about 2 days to about 8 days.

13. The method of claim 1, wherein the mixture is incubated at a temperature ranging from about 20° C. to about 25° C.

14. The method of claim 1, wherein a stabilizer is added to the mixture, wherein the stabilizer comprises alginate, agar, carrageenan, cellulose, gelatin, guar gum, gum arabic, locust bean gum, pectin, starch, xanthan gum, or a combination thereof.

15. A marking solution for marking a hydrated tissue specimen with a random speckle pattern, the marking solution comprising a colloidal metal nanoparticle suspension containing a plurality of aggregated metal nanoparticles, wherein each of the plurality of aggregated metal nanoparticles includes a plurality of individual metal nanoparticles, wherein each of the plurality of aggregated metal nanoparticles has a particle size ranging from about 0.75 micrometers to about 100 micrometers, and wherein each of the plurality of individual metal nanoparticles has a particle size ranging from about 100 nanometers to about 200 nanometers.

16. A tissue specimen mechanical testing system comprising:
an apparatus configured to subject the tissue specimen to one or more mechanical testing protocols;
an image capture device configured to obtain a plurality of images of the tissue specimen as it is subjected to the one or more mechanical testing protocols;
a marking solution for applying a random speckle pattern to the tissue specimen when the tissue specimen is in a hydrated state, the marking solution comprising a colloidal metal nanoparticle suspension containing a plurality of aggregated metal nanoparticles, wherein each of the plurality of aggregated metal nanoparticles includes a plurality of individual metal nanoparticles, wherein each of the plurality of aggregated metal nanoparticles has a particle size ranging from about 0.75 micrometers to about 100 micrometers;
a first memory for storing data corresponding to measured positions of selected image points from the plurality of images to monitor a displacement of one or more speckles present on the tissue specimen;
a second memory for storing software in the form of computer-executable instructions; and
a processor coupled to the first and second memories and configured to selectively implement the computer-executable instructions stored in the second memory to process the data stored in the first memory, wherein the processor implements the computer-executable instructions stored in the second memory in order to implement the functions of determining one or more mechanical properties of the tissue specimen.

17. The mechanical testing system of claim 16, wherein each of the plurality of individual metal nanoparticles has a particle size ranging from about 100 nanometers to about 200 nanometers.

18. The mechanical testing system of claim 16, wherein the plurality of individual metal nanoparticles comprises gold nanoparticles, silver nanoparticles, nickel nanoparticles, or platinum nanoparticles.

19. The mechanical testing system of claim 16, wherein the image capture device comprises a digital camera comprising a charge coupled device.

* * * * *